(12) United States Patent
Heinonen et al.

(10) Patent No.: US 7,602,754 B2
(45) Date of Patent: *Oct. 13, 2009

(54) SHORT-RANGE RF ACCESS POINT DESIGN ENABLING SERVICES TO MASTER AND SLAVE MOBILE DEVICES

(75) Inventors: Tomi Heinonen, Tampere (FI); Timo M. Laitinen, Tampere (FI)

(73) Assignee: NOKIA Corporation, Espoo (FI)

( * ) Notice: Subject to any disclaimer, the term of this patent is extended or adjusted under 35 U.S.C. 154(b) by 954 days.

This patent is subject to a terminal disclaimer.

(21) Appl. No.: 10/861,483

(22) Filed: Jun. 7, 2004

(65) Prior Publication Data

US 2004/0221046 A1  Nov. 4, 2004

Related U.S. Application Data

(63) Continuation of application No. 10/072,969, filed on Feb. 12, 2002, now Pat. No. 6,795,421.

(51) Int. Cl.
    *H04L 12/56*  (2006.01)
(52) U.S. Cl. .................................................. 370/338
(58) Field of Classification Search .................. 370/338
    See application file for complete search history.

(56) References Cited

U.S. PATENT DOCUMENTS

| 6,130,623 | A  | 10/2000 | MacLellan et al. |
| 6,297,737 | B1 | 10/2001 | Irvin |
| 6,404,339 | B1 | 6/2002  | Eberhardt |
| 6,566,997 | B1 | 5/2003  | Bradin |
| 6,690,402 | B1 | 2/2004  | Waller et al. |
| 6,795,421 | B1 * | 9/2004 | Heinonen et al. ........... 370/338 |
| 6,989,741 | B2 | 1/2006  | Kenny et al. |

(Continued)

FOREIGN PATENT DOCUMENTS

EP    1 207 654 A1    5/2002

(Continued)

OTHER PUBLICATIONS

Kuijpers et al. "Bluetooth PAN Profile: Dynamic Master Configuration", Vehicular Technology Conference, Proceedings VTC 2002-Fall; 2002 IEEE 56th, vol. 4, pp. 2440-2444.

*Primary Examiner*—Melvin Marcelo
(74) *Attorney, Agent, or Firm*—Locke Lord Bissell & Liddell

(57) ABSTRACT

A short-range RF access point contains two Bluetooth devices. The first device is programmed to remain a master device. The second device is programmed to remain a scanning slave device. The two devices are connected to exchange clock, address, and synchronization information. The access point master device transmits inquiry and paging packets and establishes connections with potential slave devices that respond to inquiries from the master device. The master device's clock is the piconet clock for the resulting connections. The access point slave device primarily remains in an inquiry scanning mode, searching for inquiry packets from mobile devices that are potential master devices. When the access point slave device receives the inquiry packets and paging packets from a mobile device, it then passes control to the access point master device. Several embodiments are disclosed for passing control from the access point slave to the access point master.

34 Claims, 19 Drawing Sheets

U.S. PATENT DOCUMENTS

| | | |
|---|---|---|
| 7,049,963 B2 | 5/2006 | Waterhouse et al. |
| 7,152,040 B1 | 12/2006 | Hawthorne et al. |
| 7,369,576 B2 * | 5/2008 | Famolari ............... 370/503 |
| 2001/0007815 A1 | 7/2001 | Philipsson |
| 2001/0010689 A1 | 8/2001 | Awater et al. |
| 2002/0106988 A1 | 8/2002 | Davie et al. |
| 2003/0060222 A1 * | 3/2003 | Rune .................. 455/517 |
| 2003/0147424 A1 * | 8/2003 | Famolari ............... 370/503 |
| 2004/0164166 A1 | 8/2004 | Mahany et al. |
| 2005/0134461 A1 | 6/2005 | Gelbman et al. |
| 2005/0269411 A1 | 12/2005 | Vesikivi et al. |
| 2006/0132310 A1 | 6/2006 | Cox et al. |
| 2006/0145865 A1 | 7/2006 | Forster |

FOREIGN PATENT DOCUMENTS

| | | |
|---|---|---|
| WO | WO 02/09371 | 1/2002 |
| WO | WO 02/39674 | 5/2002 |

* cited by examiner

SHORT-RANGE RF ACCESS POINT DESIGN ENABLING SERVICES TO MASTER AND SLAVE MOBILE DEVICES

This application is a continuation of U.S. application Ser. No. 10/072,969, filed Feb. 12, 2002, entitled, "Short-Range RF Access Point Design Enabling Services to Master and Slave Mobile Devices," now U.S. Pat. No. 6,795,421, issued Sep. 21, 2004," and which is incorporated herein by reference.

FIELD OF THE INVENTION

The invention disclosed broadly relates to ubiquitous computing and more particularly relates to improvements in short range RF technology.

BACKGROUND OF THE INVENTION

Short-range RF systems have a typical range of one hundred meters or less. They often combine with systems wired to the Internet to provide communication over long distances. The category of short-range RF systems includes wireless personal area networks (PANs) and wireless local area networks (LANs). They have the common feature of operating in unlicensed portions of the radio spectrum, usually either in the 2.4 GHz Industrial, Scientific, and Medical (ISM) band or the 5 GHz Unlicensed-National Information Infrastructure (U-NII) band. Wireless personal area networks use low cost, low power wireless devices that have a typical range of ten meters. The best-known example of wireless personal area network technology is the Bluetooth Standard, which operates in the 2.4 GHz ISM band. It provides a peak air link speed of one Mbps and a power consumption low enough for use in personal, portable electronics such as PDAs and mobile phones. Wireless local area networks (LANs) generally operate at higher peak speeds of between 10 to 100 Mbps and have a longer range, which requires greater power consumption. Wireless local area networks are typically used as wireless links from portable laptop computers to a wired LAN, via an access point (AP). Examples of wireless local area network technology include the IEEE 802.11 Wireless LAN Standard and the HIPERLAN Standard, which operates in the 5 GHz U-NII band.

Bluetooth is a short-range radio network, originally intended as a cable replacement. It can be used to create ad hoc networks of up to eight devices operating together. The Bluetooth Special Interest Group, *Specification Of The Bluetooth System,* Volumes 1 and 2, Core and Profiles: Version 1.1, Feb. 22, 2001, describes the principles of Bluetooth device operation and communication protocols. The devices operate in the 2.4 GHz radio band reserved for general use by Industrial, Scientific, and Medical (ISM) applications. Bluetooth devices are designed to find other Bluetooth devices within their ten meter radio communications range and to discover what services they offer.

A connection between two Bluetooth devices is initiated by an inquiring device sending out an inquiry message searching for other devices in its vicinity. Any other Bluetooth device that is listening by means of conducting an inquiry scan, will recognize the inquiry message and respond. The inquiry response is a frequency hop synchronization (FHS) packet containing all of the information required by the inquiring device to address the responding device. This information includes clock value of the sender (i.e., the responding device) and the sender's correct device access code. The access code includes the lower address part (LAP) and the upper address part (UAP) of the sender's Bluetooth Device Address (BD_ADDR), a unique, 48-bit IEEE address that is electronically engraved into each Bluetooth device.

Each Bluetooth device synchronizes transmit and receive data exchanges with other Bluetooth devices using its own real time clock counter or time of day counter. The clock counter has a 28 bit count which is reset to zero at power-on and free-runs thereafter, incrementing every half slot of 312.5 microseconds. The clock counter therefore defines a slot interval of 625 microseconds. The clock counter wraps approximately once per day. Every device has its own native free-running clock counter that controls the timing and operation of that device, referred to as "CLKN". If a device is operating as a master device, it controls the piconet using its own clock CLKN as its internal reference timing. If a device is operating as a slave device, then its timing must be exactly synchronized with that of the master in its piconet. To synchronize with the master, the slave device must add an offset value onto its own native clock CLKN to derive a new clock value "CLK" which is its estimate of the master's clock CLKN. If a device is operating as a master device, it creates an estimate clock value "CLKE", which is an estimate of the CLK in a slave device with which the master is establishing a connection, prior to the slave having become synchronized with the master. The lowest two bits of CLK are directly used to define the beginning of the slots and half-slots for transmitting and receiving packets. A master transmission in the connected state always starts when CLK=00, and a slave transmission in the connected state always starts when CLK=10. A finer synchronization can then be achieved by a device using the synchronization word in the received packets to re-align the timing.

The Bluetooth transceiver is a frequency-hopping spread-spectrum radio system operating over 79 radio frequency channels, each being one megahertz wide. The radio hops at a rate of 1600 hops per second, pseudo-randomly across all 79 of these frequencies. The residence interval for the radio remaining at any one frequency is the slot time of 625 microseconds per hop. The hop channel selection function is a mapping algorithm which follows a different sequence, depending on the link control state: [1] page or inquiry state; [2] page response or inquiry response state; [3] page scan or inquiry scan state; or [4] connection state. For a particular one of these four hop channel sequences, the current frequency in that sequence depends on the lower address part (LAP) and upper address part (UAP) of the supplied Bluetooth Device Address (BD_ADDR), and it depends on the current CLK value.

The inquiring device will become the master and the responding device will become the slave in the eventual piconet, if a connection is established. To establish a connection, the inquiring device must enter the page state. The inquiring/paging device uses the information provided in the inquiry response packet, to prepare and send a paging message to the responding device. The inquiring/paging device uses the estimated clock CLKE and access code of the responding device (i.e., the eventual slave device) to temporarily synchronize with it. Since the inquiring/paging device intends to be the master, it includes an assignment of an active member address (AM_ADDR) in the paging message. The paging message sent by the inquiring/paging device is also a frequency hop synchronization (FHS) packet containing all of the information required by the responding device to directly reply to the inquiring/paging device. This information includes clock value of the sender (i.e., the inquiring/paging device) and the inquiring/paging device's correct device access code. The responding device must be in the page scan state to allow the inquiring/paging device to connect with it. Once in the page scan state, the responding device will receive the paging packet that provides the clock timing and access code of the inquiring/paging device. The responding device responds with a page acknowledgment packet. This enables the two devices to form a connection and both devices transition into the connection state. The inquiring/paging device that has initiated the connection assumes the role of a master device and the responding device assumes the role of a slave device in a new ad hoc network piconet, using the CLK clock timing and access code of the master device.

Each piconet has one master device and up to seven active slave devices. All communication is directed between the master device and each respective slave device. The master initiates an exchange of data and the slave responds to the master. When two slave devices are to communicate with each other, they must do so through the master device. The master device maintains the piconet's network clock and controls when each slave device can communicate with the master device. Members of the ad hoc network piconet join and leave as they move into and out of the range of the master device. Piconets support distributed activities, such as multi-user gateways to the Internet or to a content server, wherein one device serves as the access point and is connected to an infrastructure network or content server. A user's device that joins a multi-user gateway piconet, does so to enable its user to access the infrastructure network or content server.

During ongoing piconet operation, a master Bluetooth device transmits on even-numbered slots and receives on odd numbered slots. Each of up to seven active slave devices can take its turn transmitting on one of the odd numbered slots. A slave transmits only if the master has transmitted to it on the previous even slot. This tight time-division duplex timing cannot be maintained when the master device is sending inquiry packets to attract still another slave device. The speed of establishing a connection with a new slave device is also impaired.

A master Bluetooth device transmits two inquiry packets per slot on successive even slots. The master listens for a response in both halves of its following receive slot. If the master receives the inquiry response packet in the first half of its receive slot, it cannot receive a response from a second slave in the second half of the slot because it does not have the time to hop to a second frequency. Thus, the available bandwidth of a master device for normal traffic is reduced when the master engages in the inquiry and paging with a new potential slave device. When the master device is an access point serving as a gateway for multiple mobile devices to an infrastructure network, it is important to maintain the highest traffic bandwidth. It is also important not to impair the speed in establishing a connection with a new slave device.

The Bluetooth device in an access point may also receive an inquiry packet from a mobile device. If the access point device replies with an inquiry response packet, the access point device is potentially the slave in the eventual second piconet to be formed between the two devices. The access point device forms two device domains, one is the master domain with its master clock serving the existing piconet. The second domain is the slave domain where the access point device adopts the clock of the mobile device serving as a master in the second piconet. A slave device can only have one master device. Access point devices are therefore typically programmed to then signal for a master-slave role switch. Any Bluetooth device can be programmed to request a switch in roles with respect to another device it is communicating with. The master in a access point is typically programmed to allow it to be paged and connected to a mobile device, forming a temporary slave domain in the access point device. It is programmed to then send a request to the mobile device to switch roles. If the mobile device agrees, then the access point device must send detailed information on its clock, so that the mobile device can move onto the access point device's timing. The access point device sends an FHS packet to give the timing information and a new active member address to the mobile device. Then both devices switch to the frequency hop sequence of the access point device. The access point device then sends a POLL packet to the mobile device, which is now a slave device, to test the new link. In this manner, the slave domain of the access point device imposes its clock onto the paired mobile device and they switch master/slave roles. The two domains in the access point then merge into the single master domain and its clock serves as the master clock for all of the slave devices. During the period when the access point is managing both a master and a slave domain, tight time-division duplex timing cannot be maintained and its bandwidth is impaired. The speed of establishing a connection with a new slave device is also impaired.

FIG. 5 illustrates an example prior art system, where the access point 140' can have one or more prior art Bluetooth communication modules 140A, 140B, and 140C. The modules 140A, 140B, and 140C function independently. This causes bandwidth problems whenever a new mobile device 10A, 100B, or 100C is trying to join to an existing ad-hoc network 110A, 110B, or 110C, respectively. For example, if modules 140A, 140B, and 140C are functioning independently, then when a mobile device 110A sends an Inquiry message, it is possible that more than one of the access point modules 140A, 140B, and 140C receive the messages and responds by sending an Inquiry Response message. This coincident response by two or more access point modules 140A, 140B, and 140C leads to a situation where communication with other mobiles is pointlessly hindered.

What is needed is a way to solve the problem of limited bandwidth of a Bluetooth access point, and to shorten the time required by the access point when establishing connection with both mobile master devices and mobile slave devices.

SUMMARY OF THE INVENTION

The invention solves the problem of how to maximize bandwidth of an access point and the speed of its establishing a connection with both mobile master devices and mobile slave devices. In accordance with the invention, the short range RF access point contains two Bluetooth devices. The first device is programmed to remain a master device. The second device is programmed to remain a scanning slave device. The two devices are connected to exchange clock, address, and synchronization information. The access point master device transmits inquiry and paging packets and establishes connections with potential slave devices that respond to inquiries from the master device. The master device's clock is the piconet clock for the resulting connections.

The access point slave device primarily remains in an inquiry scanning mode, searching for inquiry packets from mobile devices that are potential master devices. When the access point slave device receives the inquiry packets and paging packets from a mobile device, it then passes control to the access point master device. There are two embodiments for passing control from the access point slave to the access point master.

In a first embodiment, after the access point slave device receives the inquiry packets and paging packets from a mobile device, the access point slave device aborts the normal step of sending a page response, and instead, it passes to the access point master device, the address and clock values of the mobile device received in the mobile device's paging packet. The access point master device can then directly page the mobile device. If the mobile device is programmed to periodically scan for inquiries and pages (which is a common programming practice), a connection can be readily established with the access point master device. In this embodiment, the access point master device can maintain the highest traffic bandwidth and not impair the speed in establishing a connection with a new slave device.

In a second embodiment, after the access point slave device receives the inquiry packets and paging packets from a mobile device, the access point slave device establishes a temporary piconet with the mobile device. Then the access point slave device signals for a master-slave role switch, whereby the access point slave device imposes its clock onto the paired mobile device and they switch master/slave roles. The clock value and address used by the access point slave device in the role switch is the clock and address of the access point master device. The active member address (AM_ADDR) assigned to the mobile device is the next available slave-member number for the access point master device. Then, the access point slave device, which has assumed a temporary master role, transfers the connection formed with the mobile device, to the access point master device. In this manner, the bandwidth of the programmed master device is not impaired when the access point forms an initial connection with a mobile master device.

In accordance with an alternate embodiment of the invention, the Bluetooth access point contains three Bluetooth devices. [a] The first device is a piconet managing master device programmed to remain a master device and to manage existing connections with mobile slave devices in a piconet. [b] The second device is a scanning slave device programmed to primarily remain a slave device and to form connections with mobile master devices. [c] The third device is an inquiring/paging master device programmed to transmit inquiry and paging packets and establish connections with potential slave devices that respond to its inquiries. The three devices are connected to exchange clock, address, and synchronization information. The [a] piconet managing master device clock is used as the piconet clock for the resulting connections with mobile devices. When the [c] inquiring/paging master device forms a connection with a slave device, it hands off the new slave device to the [a] piconet managing master device.

The access point slave device primarily remains in an inquiry scanning mode, searching for inquiry packets from mobile devices that are potential master devices. When the access point slave device receives the inquiry packets and paging packets from a mobile device, it then passes control to the access point to one of the two master devices. There are two embodiments for passing control from the access point slave device.

In a first embodiment, after the access point slave device receives the inquiry packets and paging packets from a mobile device, the access point slave device aborts the normal step of sending a page response, and instead, it passes to the access point [c] inquiring/paging master device, the address and clock values of the mobile device received in the mobile device's paging packet. The access point [c] inquiring/paging master device can then directly page the mobile device. If the mobile device is programmed to periodically scan for inquiries and pages, a connection can be readily established with the access point [c] inquiring/paging master device. Then, the [c] inquiring/paging master device passes the mobile's connection to the piconet managing master device. In this embodiment, the access point piconet managing master device can maintain the highest traffic bandwidth and not impair the speed in establishing a connection with a new slave device.

In a second embodiment, after the access point slave device receives the inquiry packets and paging packets from a mobile device, the access point slave device establishes a temporary piconet with the mobile device. Then the access point slave device signals for a master-slave role switch, whereby the access point slave device imposes its clock onto the paired mobile device and they switch master/slave roles. The clock value and address used by the access point slave device in the role switch is the clock and address of the access point piconet managing master device. The active member address (AM_ADDR) assigned to the mobile device is the next available slave-member number for the access point piconet managing master device. Then, the access point slave device, which has assumed a temporary master role, transfers the connection formed with the mobile device, to the access point piconet managing master device.

In another alternate embodiment of the invention, the access point includes two devices, the piconet managing master device and the hybrid master/slave device. The hybrid master/slave device blends the features of the scanning slave device and the inquiring/paging master device.

In another alternate embodiment, the invention can be embodied as a wireless transceiver that is either a fixed station access point or alternately a mobile wireless transceiver. The managing master device in the transceiver, manages existing connections with mobile slave devices in a wireless network. The scanning slave device in the transceiver, forms connections with mobile master devices. The inquiring/paging master device in the transceiver, transmits inquiry and paging packets and establishes connections with potential slave devices that respond. In one implementation, the wireless transceiver is a stationary access point coupled to an infrastructure network. In another implementation, the wireless transceiver is a mobile wireless transceiver. In still another embodiment, the scanning slave device and the inquiring/paging master are the same hybrid device, the hybrid device being programmed to periodically operate as the scanning slave device and alternately as the inquiring/paging master device.

In this manner, the bandwidth and connection speed of the managing master device is not impaired when an initial connection is formed with a mobile master device.

DISCUSSION OF THE PREFERRED EMBODIMENT

In the following description of the preferred embodiment, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

The invention is a method, system, and computer program product to maximize bandwidth of a short range RF access point and the speed of its establishing a connection with both mobile master devices and mobile slave devices. The invention provides an access point with a first Bluetooth device programmed as a master device and a second Bluetooth device programmed as a scanning slave device. The access point master device is programmed to transmit inquiry and paging packets and to establish connections with mobile slave devices that respond to its inquiries. The access point slave device in programmed to primarily remain in an inquiry scanning mode to search for inquiry packets from mobile devices that are potential master devices and to pass control to the access point master device upon receiving a paging packet from a mobile device.

Figure 1:
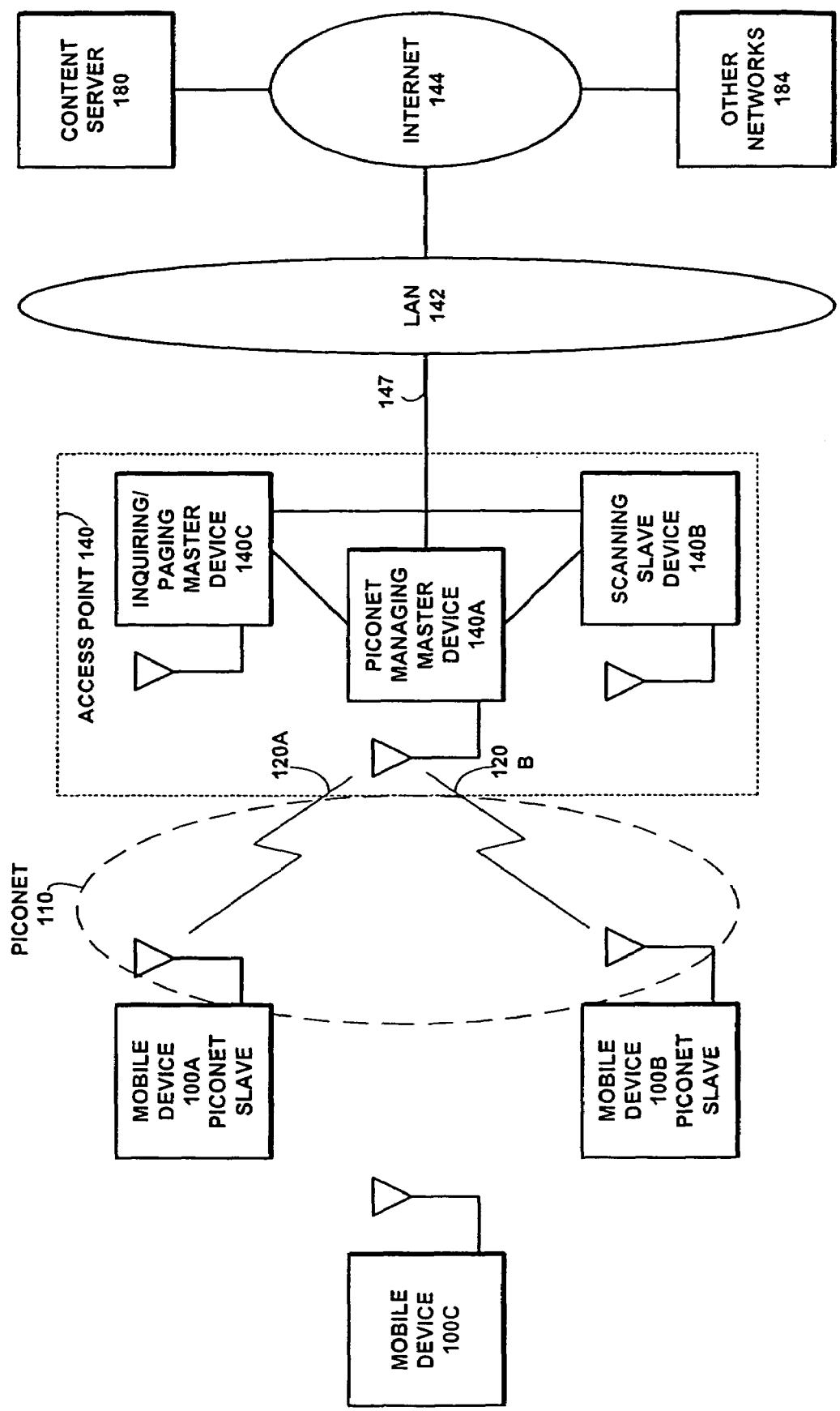
FIG. 1 is a network diagram of one embodiment of the invention, showing mobile Bluetooth devices 100A and 100B as members of the piconet 110 managed by the Bluetooth piconet managing master device 140A of the access point 140. Mobile device 100C is in the vicinity of the access point 140. The access point 140 also includes the scanning slave device 140B and, in this particular embodiment, an inquiring/paging master device 140C. The access point 140 is connected to the infrastructure network including the LAN 142 and Internet 144. The Internet is connected to content servers and other networks. Each Bluetooth device in the access point of this embodiment of the invention is assigned to a specific function: managing master, scanning slave, or inquiring/paging master.

In the network of FIG. 1 illustrating one embodiment of the invention, mobile Bluetooth devices 100A and 100B are existing members of the piconet 110, and are managed by the Bluetooth piconet managing master device 140A of the access point 140. Bluetooth device 100A communicates over radio link 120A and Bluetooth device 100B communicates over radio link 120B with the Bluetooth piconet managing master device 140A. Piconet managing master device 140A manages up to seven active slave devices 100A, 100B, etc. All communication is directed between the managing master device 140A and each respective slave device. The managing master device 140A initiates an exchange of data and the slave responds to the master. When two slave devices are to communicate with each other, they must do so through the managing master device 140A. The managing master device 140A maintains the piconet's network clock and controls when each slave device can communicate with the managing master device 140A. Members of the ad hoc network piconet 110 join and leave as they move into and out of the range of the managing master device 140A. During ongoing piconet operation, managing master device 140A transmits on even-numbered slots and receives on odd numbered slots. Each of up to six slave devices 100A, 100B, etc. can take its turn transmitting on one of the odd numbered slots. A slave transmits only if the master has transmitted to it on the previous even slot.

The access point 140 also includes the scanning slave device 140B. The scanning slave device 140B is programmed to listen for an inquiring mobile device sending out an inquiry message. The scanning slave device 140B listens by means of conducting an inquiry scan to recognize the inquiry message. When it detects an inquiry message, it responds by sending an inquiry response, which is a frequency hop synchronization (FHS) packet containing all of the information required by the mobile device to address the scanning slave device 140B. This information includes clock value of the scanning slave device 140B and its access code. The access code is the lower address part (LAP) and the upper address part (UAP) of a Bluetooth Device Address (BD_ADDR). There are several alternatives that the scanning slave device 140B can use for its access code. In one embodiment, it can use its own BD_ADDR. Alternately, the scanning slave device 140B can use the BD_ADDR of the piconet managing master device 140A, since ultimately the mobile device will be shifted to its piconet 110. The piconet managing master device 140A may be programmed to ignore paging packets addressed to its BD_ADDR, so that only the scanning slave device 140B will respond. The mobile device uses the information provided in the inquiry response packet, to prepare and send a paging packet to the scanning slave device 140B. To establish a connection, the mobile device must enter the page state. In the page state, the mobile device will transmit initial paging messages to the scanning slave device 140B using the access code and timing information acquired from the inquiry response packet. The paging message sent by the mobile device is also a frequency hop synchronization (FHS) packet containing all of the information required by the scanning slave device 140B to directly reply to the mobile device. This information includes clock value of the mobile device and the mobile device's correct device access code. The scanning slave device 140B must be in the page scan state to allow the mobile device to connect with it. Once in the page scan state, the scanning slave device 140B will receive the paging packet that provides the clock timing and access code of the mobile device.

In a first embodiment, the scanning slave device 140B aborts sending a page acknowledgment packet (page response), and instead, passes the clock value of the mobile device and the mobile device's correct device access code to a master device in the access point to establish a connection with the mobile device. In one embodiment, the mobile's information is passed to the piconet managing master device 140A of the access point 140. In another embodiment, the mobile's information is passed to a second master device 140C in the access point 140. In either embodiment, the master device 140A or 140C receives the mobile device's access code and clock values and uses them to send a page packet to the mobile device. The master device 140A or 140C uses the information provided in the mobile device's paging packet, to establish the estimated clock CLKE and access code of the mobile device to temporarily synchronize with it. If the mobile device is in a periodic page scan mode, then a connection can be established with the master device 140A or 140C. If it is the inquiring/paging master device 140C that establishes the connection, then it passes the mobile's connection to the piconet managing master device 140A. Since, in this embodiment, the inquiring/paging master device 140C is to become the master of the connection to the mobile device, and then transfer that connection to the piconet managing master device 140A, the inquiring/paging master device 140C must be able to transfer a connection having a frequency hop sequence synchronized with that of the piconet managing master device 140A. To accomplish this, the inquiring/paging master device 140C sends an FHS paging packet to the mobile device, giving the timing information and access code of the piconet managing master device 140A. The FHS packet also contains a new active member address (AM_ADDR) assigned to the mobile device, which is the next available slave-member number for the access point piconet managing master device 140A. Then both the inquiring/paging master device 140C and the mobile device have the frequency hop sequence of the piconet managing master device 140A. The connection between the mobile device and the inquiring/paging master device 140C does not interfere with the piconet connections currently being managed by the piconet managing master device 140A, because the piconet managing master device 140A may be programmed to ignore any active member address (AM_ADDR) of a mobile device for which it has not yet assumed responsibility. Then, the inquiring/paging master device 140C transfers the connection formed with the mobile device, to the access point piconet managing master device 140A. This transfer includes passing to the managing master device 140A, the active member address (AM_ADDR) assigned to the mobile device. The mobile device then becomes a piconet slave to the piconet managing master device 140A in the piconet 110.

In a second embodiment, the scanning slave device 140B is programed to respond to the mobile device's paging packet with a page acknowledgment packet. This enables the two devices to form a connection and both devices transition into the connection state. The mobile device that has initiated the connection assumes the role of a master device and the scanning slave device 140B assumes the role of a slave device in a temporary ad hoc network piconet. The scanning slave device 140B is programmed to then send a request to the mobile device to switch master/slave roles. If the mobile device agrees, then the scanning slave device 140B must send detailed information on its clock and access code, so that the mobile device can move onto the timing of the scanning slave device 140B. Since, in this embodiment, the scanning slave device 140B is to become the master of the connection to the mobile device, and then transfer that connection to the piconet managing master device 140A, the scanning slave device 140B must be able to transfer a connection having a frequency hop sequence synchronized with that of the piconet managing master device 140A. To accomplish this, the scanning slave device 140B sends an FHS packet the mobile device, giving the timing information and access code of the piconet managing master device 140A. The FHS packet also contains a new active member address (AM_ADDR) assigned to the mobile device, which is the next available slave-member number for the access point piconet managing master device 140A. Then both the scanning slave device 140B and the mobile device switch to the frequency hop sequence of the piconet managing master device 140A. The scanning slave device 140B then sends a POLL packet to the mobile device, which is now a slave device, to test the new connection. Then, the scanning slave device 140B, which has assumed a temporary master role, transfers the connection formed with the mobile device, to the access point piconet managing master device 140A. This transfer includes passing to the managing master device 140A, the active member address (AM_ADDR) assigned to the mobile device. The mobile device then becomes a piconet slave to the piconet managing master device 140A in the piconet 110.

In the alternate embodiment of the invention, the access point 140 also includes the inquiring/paging master device 140C. The inquiring/paging master device 140C is programmed to transmit two inquiry packets per slot on successive even slots. The inquiring/paging master device 140C listens for a response in both halves of its following receive slot. The inquiring/paging master device is programmed to transmit inquiry and paging packets and establish a connection with mobile slave devices. Since, in this embodiment, the inquiring/paging master device 140C is to become the master of the connection to the mobile device, and then transfer that connection to the piconet managing master device 140A, the inquiring/paging master device 140C must be able to transfer a connection having a frequency hop sequence synchronized with that of the piconet managing master device 140A. To accomplish this, inquiring/paging master device 140C sends an FHS paging packet to the mobile device, giving the timing information and access code of the piconet managing master device 140A. The FHS paging packet also contains a new active member address (AM_ADDR) assigned to the mobile device, which is the next available slave-member number for the access point piconet managing master device 140A. Then both the inquiring/paging master device 140C and the mobile device have the frequency hop sequence of the piconet managing master device 140A. The inquiring/paging master device 140C then passes the mobile's connection, including the active member address (AM_ADDR) assigned to the mobile device, to the piconet managing master device 140A. The mobile device then becomes connected as a piconet slave to the piconet managing master device 140A in the piconet 110.

The access point 140 in FIG. 1, is connected over line 147 to the infrastructure network including the LAN 142 and Internet 144. The Internet 144 is connected to content server 180 and other networks 184. The mobile device 100C is moving into the vicinity of the access point 140 in FIG. 1. As is common in programming Bluetooth devices, mobile device 100C has been programmed to periodically transmit inquiry and paging packets and to periodically enter the scan state to scan for inquiry and paging packets from other devices.

Figure 1A:
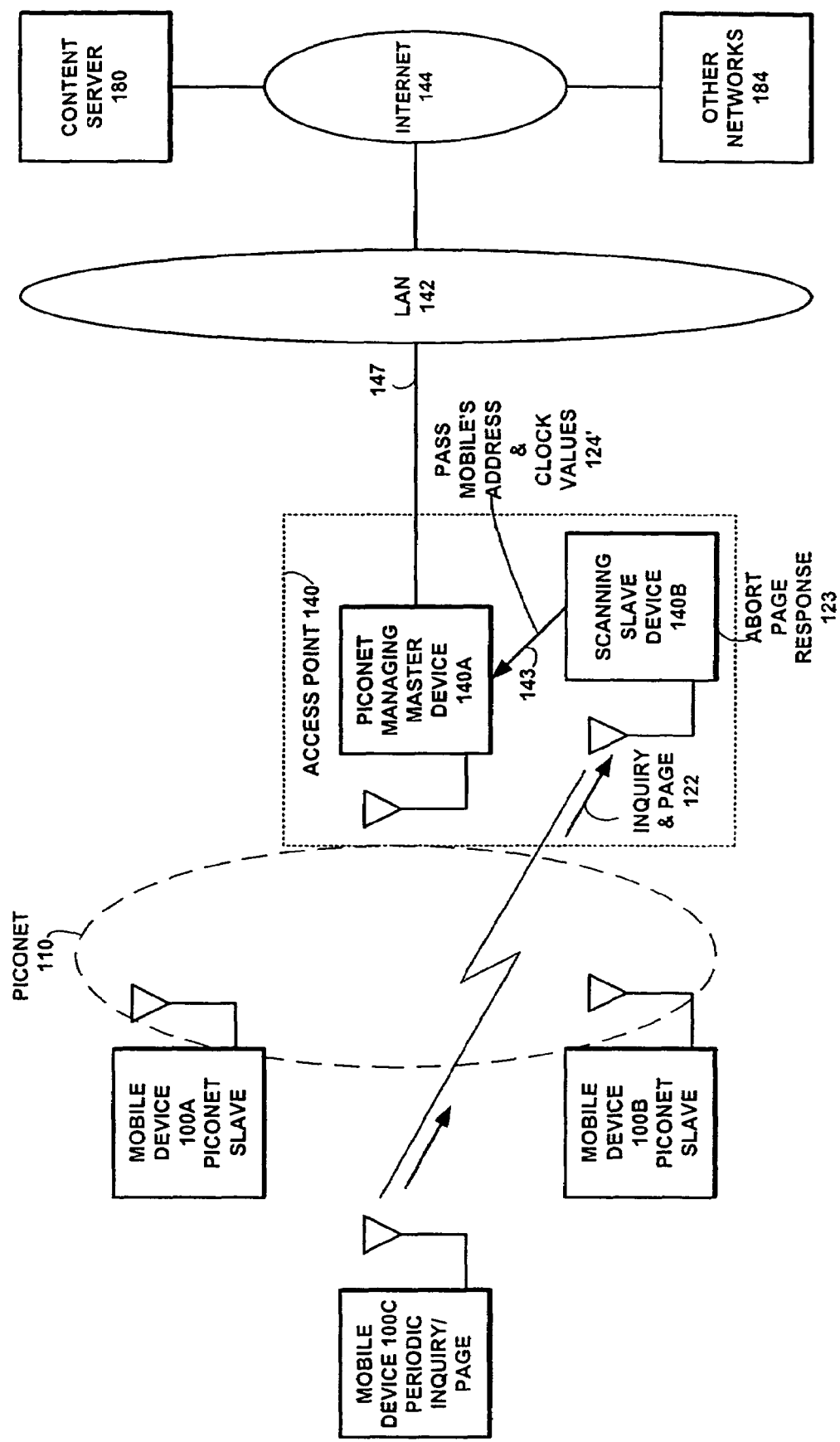
FIG. 1A illustrates the preferred embodiment wherein the access point 140 includes two devices, the piconet managing master device 140A and the scanning slave device 140B. This figure shows the scanning slave device 140B receiving an inquiry and page at step 122 from the mobile device 100C. In a first embodiment, after the access point slave device receives the inquiry packets and paging packets from a mobile device, the access point slave device aborts the page response at step 123, and passes the mobile device's address and clock values at step 124' to the piconet managing master device 140A.
Figure 1B:
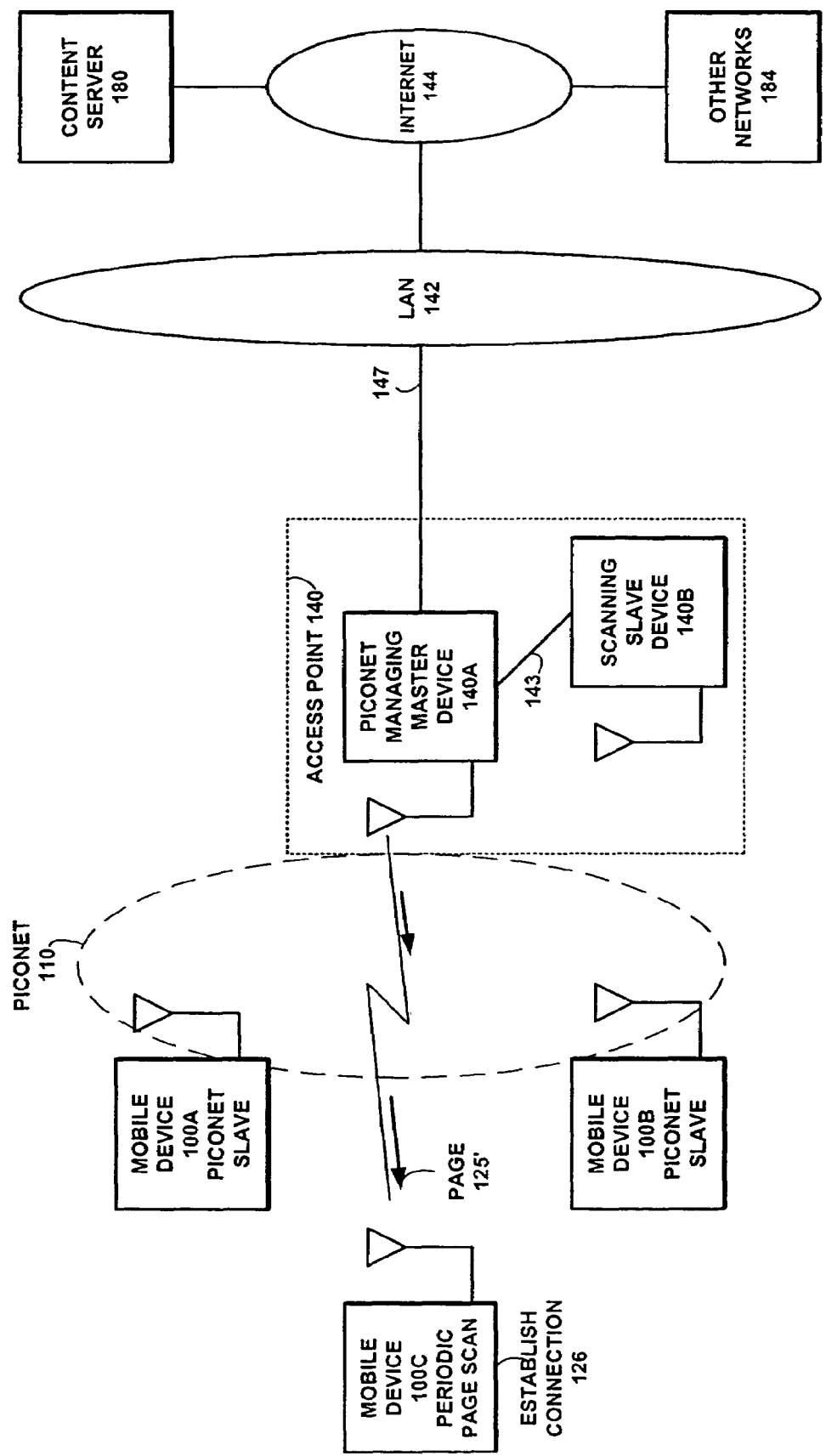
FIG. 1B illustrates the preferred embodiment in the stage following FIG. 1A, wherein the piconet managing master device 140A uses the mobile device's address and clock values to send a page packet at step 125' to the mobile device 100C. If the mobile device is in a periodic page scan mode, then a connection can be established at step 126 with the piconet managing master device 140A.
Figure 1C:
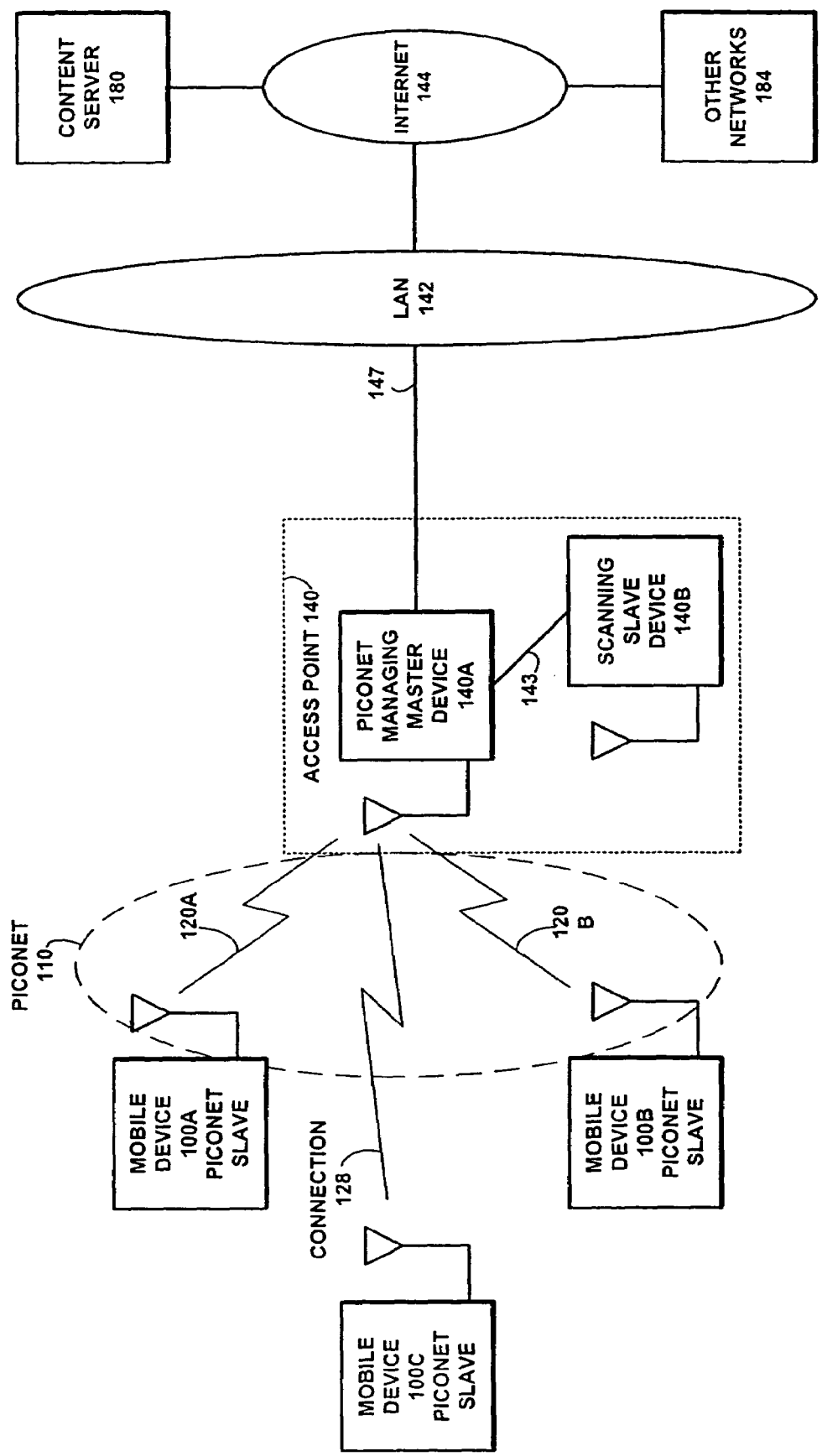
FIG. 1C illustrates the preferred embodiment in the stage following FIG. 1B, wherein the mobile device 100C has become a piconet slave to the piconet managing master device 140A in the piconet 110.

In FIG. 1A the access point 140 includes two devices, the piconet managing master device 140A and the scanning slave device 140B. This figure shows the scanning slave device 140B receiving inquiry and paging packets at step 122 from the mobile device 100C. The paging packet received from the mobile device 100C contained the mobile device's address and clock values. In a first embodiment, after the access point slave device 140B receives the inquiry packets and paging packets from the mobile device, the access point slave device 140B aborts the normally subsequent page response at step 123, and passes the mobile device's address and clock values at step 124' to the piconet managing master device 140A. In FIG. 11B the piconet managing master device 140A uses the mobile device's address and clock values to send a page packet at step 125' to the mobile device 100C. The piconet managing master device 140A uses the information provided in the mobile device's paging packet in step 122, to establish the estimated clock CLKE and access code of the mobile device to temporarily synchronize with it. The access point master device can directly page the mobile device without needing to send an inquiry message and wait for its response. If the mobile device is in a periodic page scan mode, then a connection can be established at step 126 with the piconet managing master device 140A. If the mobile device is programmed to periodically scan for inquiries and pages (which is a common programming practice), a connection can be readily established with the access point master device. In this embodiment, the access point master device can maintain the highest traffic bandwidth and not impair the speed in establishing a connection with a new slave device. In FIG. 1C the mobile device 100C has become a piconet slave to the piconet managing master device 140A in the piconet 110.

Figure 1D:
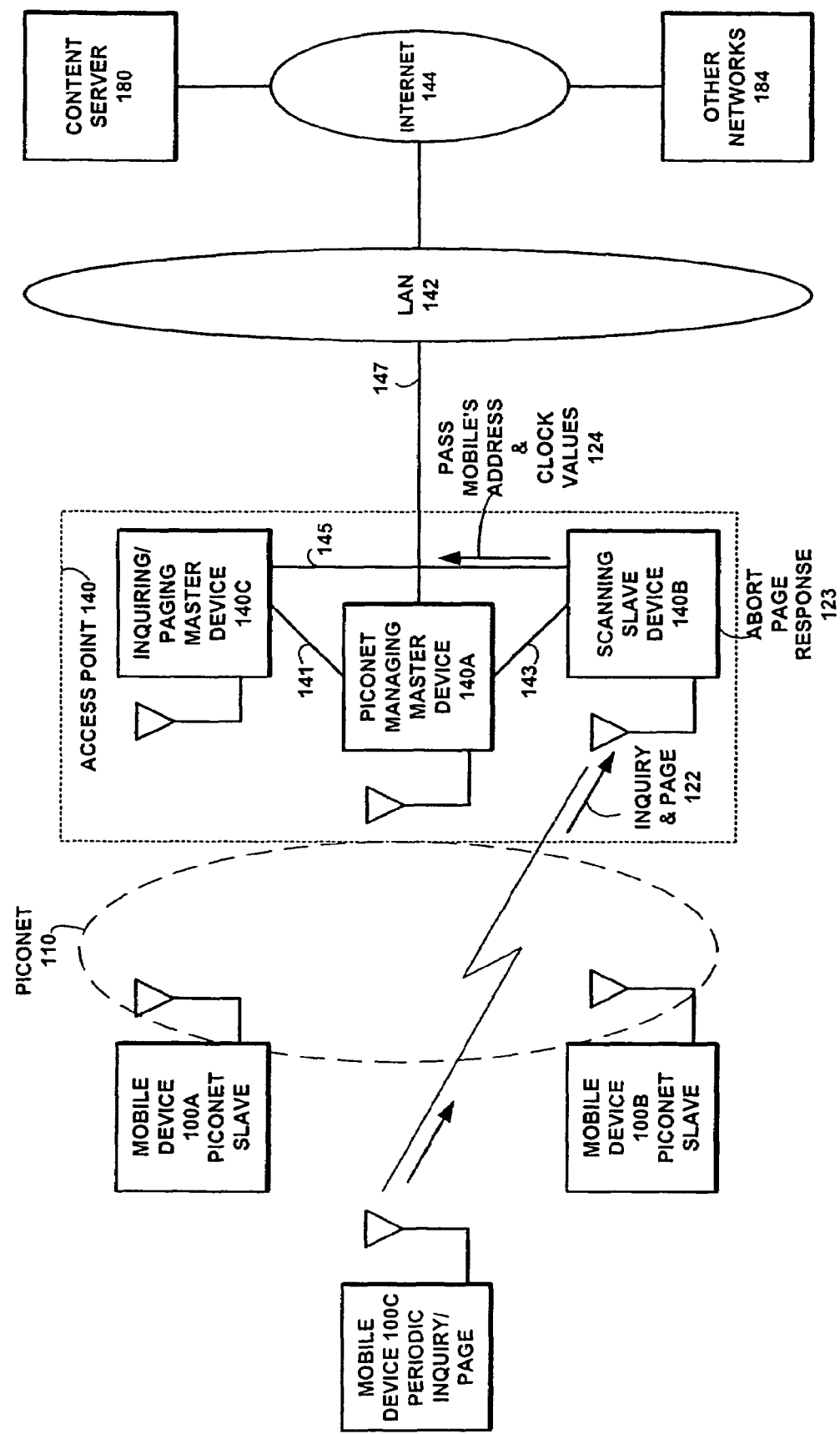
FIG. 1D illustrates an alternate embodiment wherein the access point 140 includes three devices, the piconet managing master device 140A, the scanning slave device 140B, and the inquiring/paging master device 140C. This figure shows the scanning slave device 140B receiving an inquiry and page at step 122 from the mobile device 100C, aborting the page response at step 123, and passing the mobile device's address and clock values at step 124 to the inquiring/paging master device 140C.
Figure 1E:
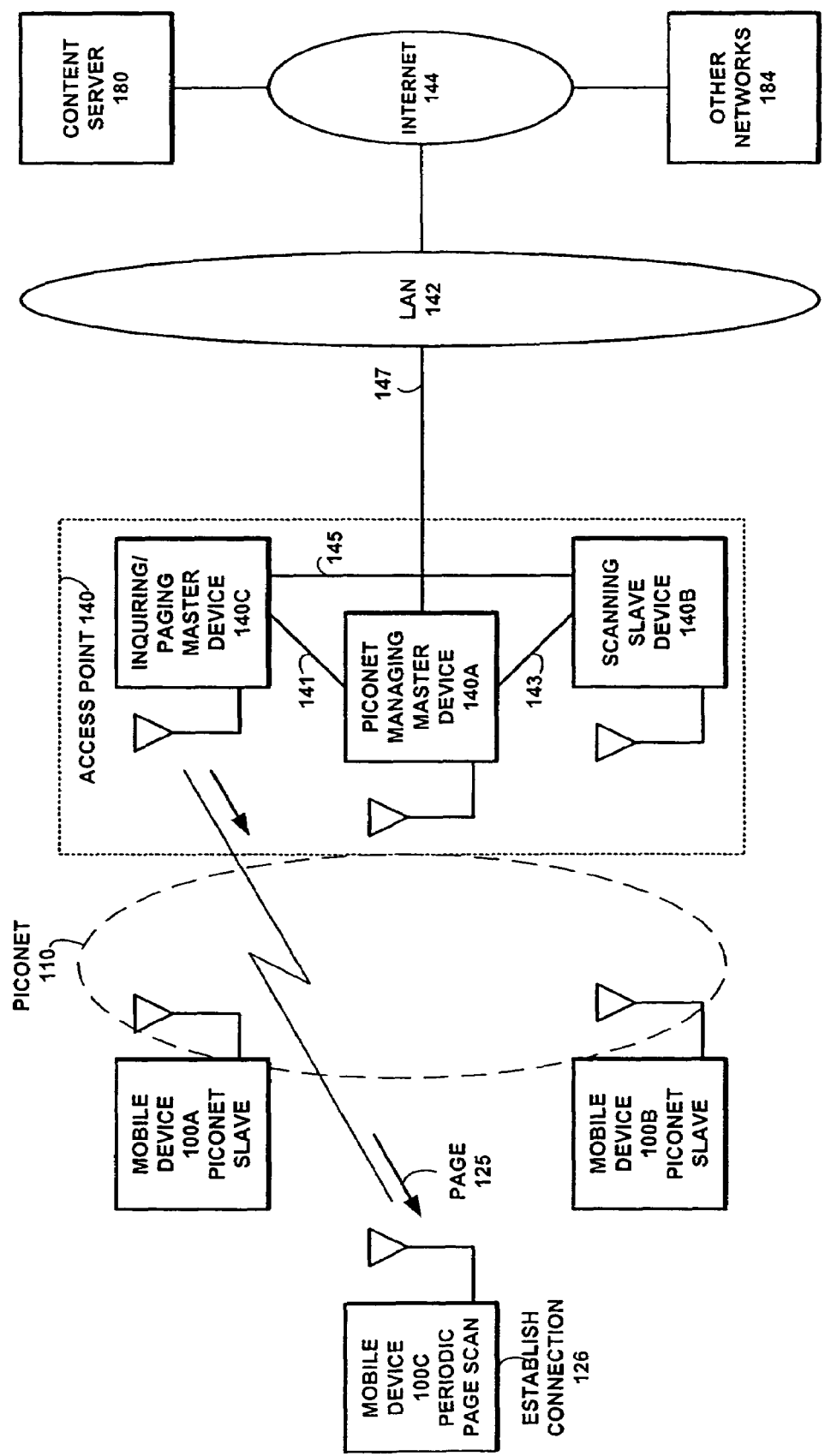
FIG. 1E illustrates the alternate embodiment in the stage following FIG. 1D, wherein the inquiring/paging master device 140C uses the mobile device's address and clock values to send a page packet at step 125 to the mobile device 100C. If the mobile device is in a periodic page scan mode, then a connection can be established at step 126 with the inquiring/paging master device 140C.
Figure 1F:
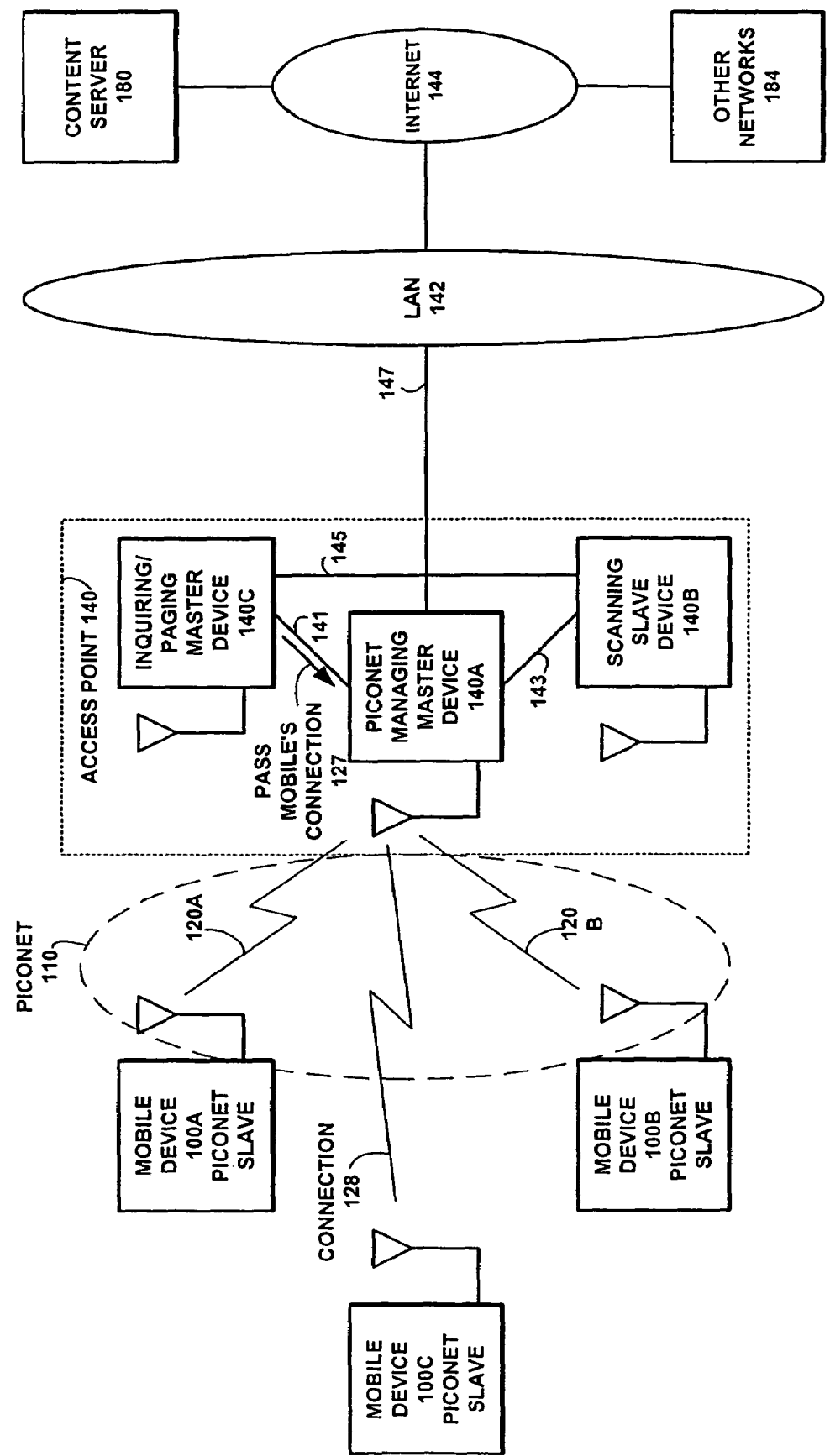
FIG. 1F illustrates the alternate embodiment in the stage following FIG. 1E, wherein the inquiring/paging master device 140C passes the mobile's connection in step 127 to the piconet managing master device 140A. The mobile device 100C has become a piconet slave to the piconet managing master device 140A in the piconet 110.

In the alternate embodiment of FIG. 1D, the access point 140 includes three devices, the piconet managing master device 140A, the scanning slave device 140B, and the inquiring/paging master device 140C. This figure shows the scanning slave device 140B receiving an inquiry and page at step 122 from the mobile device 100C, aborting the page response at step 123, and passing the mobile device's address and clock values at step 124 to the inquiring/paging master device 140C. In FIG. 1E the inquiring/paging master device 140C uses the mobile device's address and clock values to send a page packet at step 125 to the mobile device 100C. The inquiring/paging master device 140C uses the information provided in the mobile device's paging packet in step 122, to establish the estimated clock CLKE and access code of the mobile device to temporarily synchronize with it. If the mobile device is in a periodic page scan mode, then a connection can be established at step 126 with the inquiring/paging master device 140C. In FIG. 1F the inquiring/paging master device 140C passes the mobile's connection in step 127 to the piconet managing master device 140A. Since, in this embodiment, the inquiring/paging master device 140C is to become the master of the connection to the mobile device, and then transfer that connection to the piconet managing master device 140A, the inquiring/paging master device 140C must be able to transfer a connection having a frequency hop sequence synchronized with that of the piconet managing master device 140A. To accomplish this, the inquiring/paging master device 140C sends an FHS paging packet to the mobile device in step 125, giving the timing information and access code of the piconet managing master device 140A. The FHS packet also contains a new active member address (AM_ADDR) assigned to the mobile device, which is the next available slave-member number for the access point piconet managing master device 140A. Then both the inquiring/paging master device 140C and the mobile device have the frequency hop sequence of the piconet managing master device 140A. Then, the inquiring/paging master device 140C transfers the connection formed with the mobile device in step 127, to the access point piconet managing master device 140A. This transfer includes passing to the managing master device 140A, the active member address (AM_ADDR) assigned to the mobile device. The mobile device then becomes a piconet slave to the piconet managing master device 140A in the piconet 110.

Figure 2A:
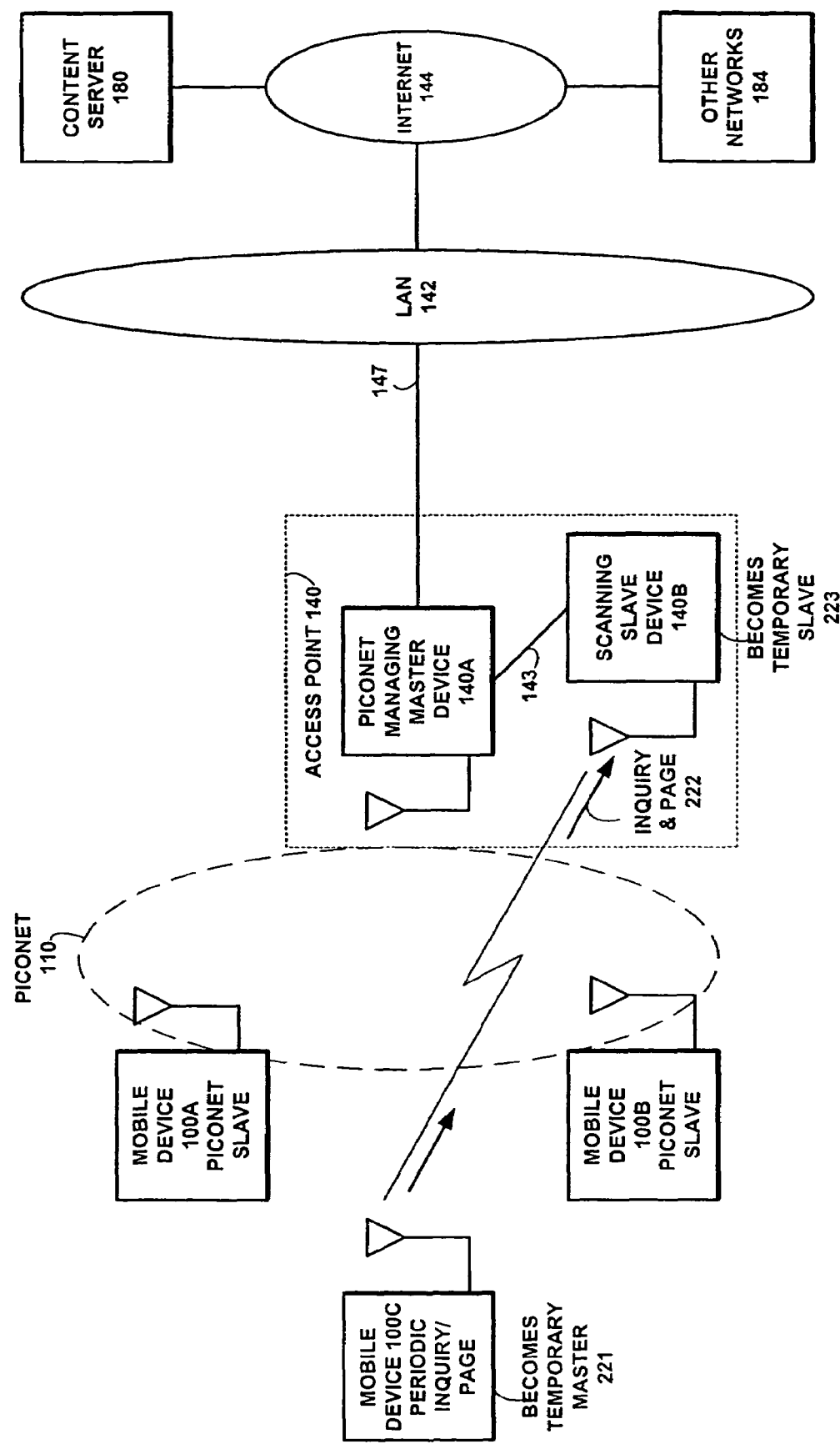
FIG. 2A illustrates the preferred embodiment wherein the access point 140 includes two devices, the piconet managing master device 140A and the scanning slave device 140B. This figure shows a second embodiment, wherein after the inquiry and page have been received in step 222, the access point slave device establishes a temporary piconet with the mobile device in step 223.
Figure 2B:
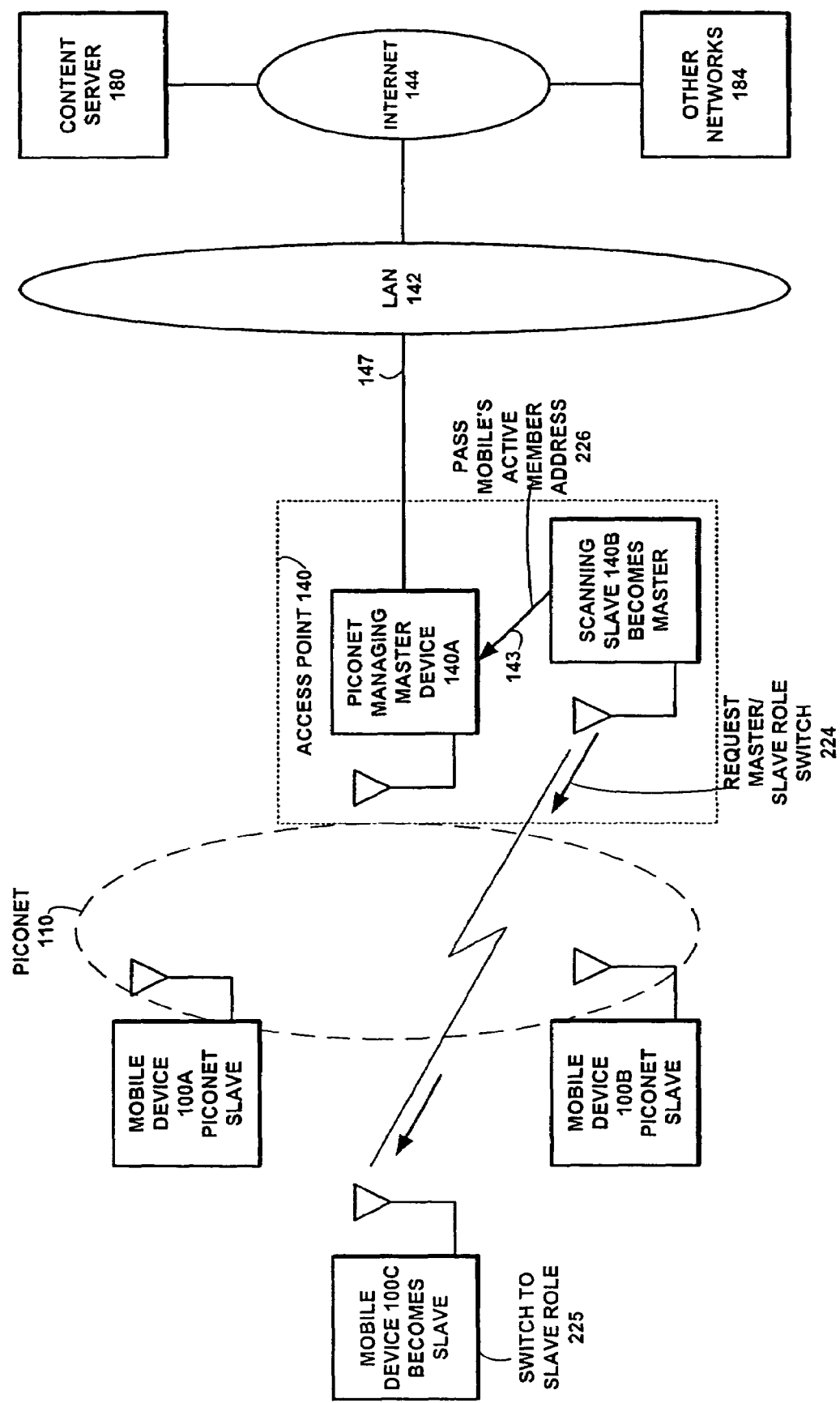
FIG. 2B illustrates the preferred embodiment in the stage following FIG. 2A, wherein the access point slave device signals for a master-slave role switch in step 224 and the mobile device switches to the slave role in step 225. Then, the access point slave device, which has assumed a temporary master role, transfers the connection formed with the mobile device, to the access point piconet managing master device at step 226.
Figure 2C:
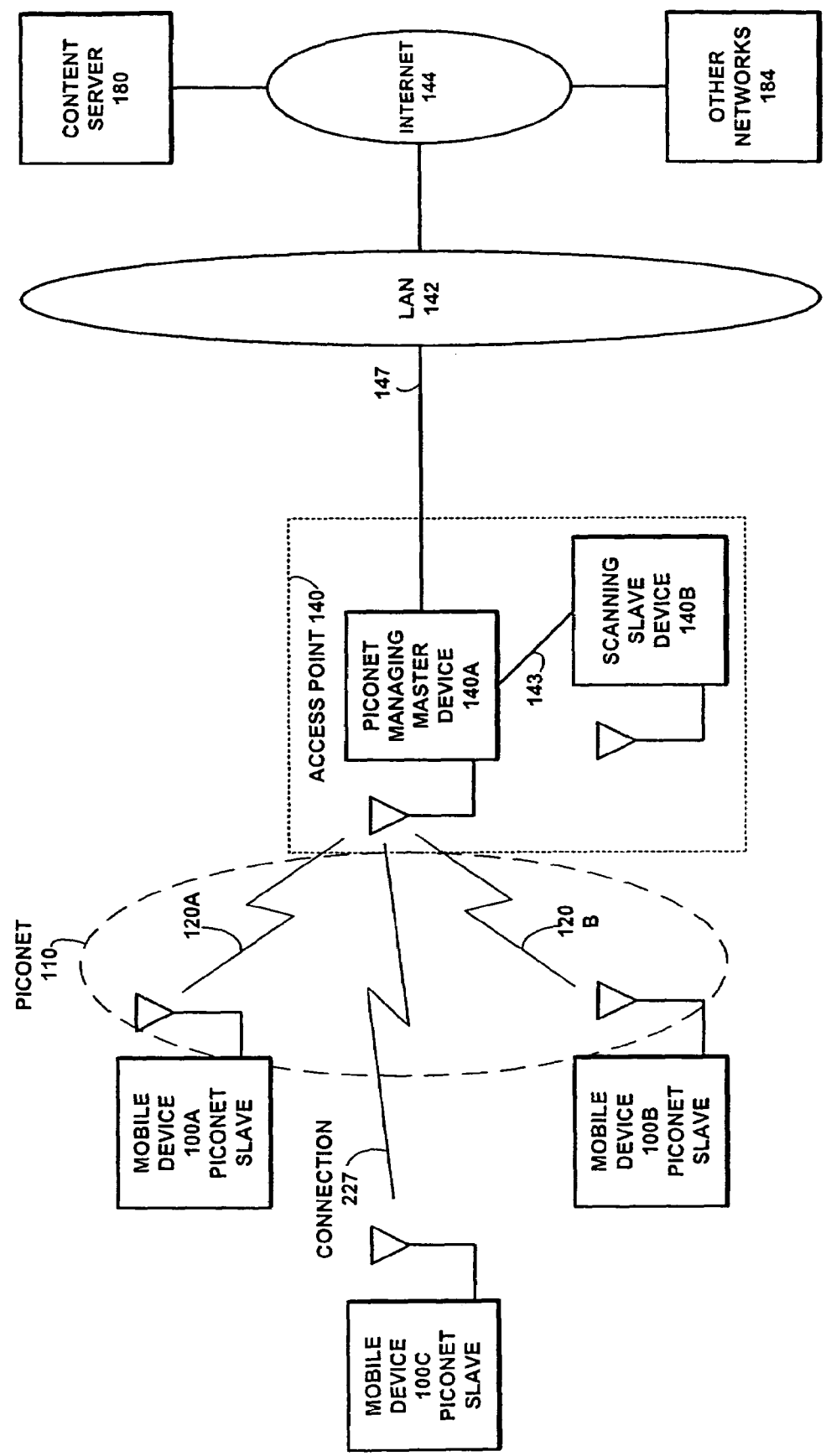
FIG. 2C illustrates the preferred embodiment in the stage following FIG. 2B, wherein the mobile device 100C has become a piconet slave to the piconet managing master device 140A in the piconet 110.

In the preferred embodiment of FIG. 2A, after the inquiry and page have been received in step 222, the access point slave device 140B establishes a temporary piconet with the mobile device in step 223. In FIG. 2B the access point slave device 140B signals for a master-slave role switch in step 224 and the mobile device 100C switches to the slave role in step 225. Then, the access point slave device 140B, which has assumed a temporary master role, transfers the connection formed with the mobile device 100C, to the access point piconet managing master device 140A at step 226. In FIG. 2C the mobile device 100C has become a piconet slave to the piconet managing master device 140A in the piconet 110. When the access point slave device 140B signals for a master-slave role switch, the access point slave device 140B imposes its clock onto the paired mobile device 100C and they switch master/slave roles. The clock value and address used by the access point slave device 140B in the role switch is the clock and address of the access point master device 140A. The active member address (AM_ADDR) assigned to the mobile device 100C is the next available slave-member number for the access point master device 140A. In this manner, the bandwidth of the programmed master device 140A is not impaired when the access point forms an initial connection with a mobile master device 100C.

There is a small probability that when slave device 140B synchronizes itself with the piconet managing master device 140A, that interference problems might arise if both devices are transmitting data in the same channel at the same time. The following two alternate embodiments avoid this chance happening. In these two alternate embodiments, the access point slave device 140B is modified so that 50% of the time it is an inquiring master device and 50% of the time it is a Scanning slave device, which scans for inquires and pages. The mobile device 100C begins as a master mobile device.

[A] In the first of these two alternate embodiments, the piconet managing master device 140A enters Page Scan mode for a predetermined short time period. The following steps occur:

[1] The device 140B is in Inquiry Scanning mode.
[2] The device 140B hears master mobile device 100C's Inquiry.
[3] The device 140B provides piconet managing master device 140A with information that there is a mobile terminal Inquiring.
[4] The piconet managing master device 140A provides the device 140B with information of its own FHS.
[5] The device 140B responds to the Inquiry with piconet managing master device 140A's FHS-packet.
[6] The device 140B informs piconet managing master device 140A to enter to Page Scanning mode for e.g. 0.1 seconds.
[7] The piconet managing master device 140A enters Page scanning-mode and receives master mobile device 100C's Paging packet.
[8] The piconet managing master device 140A negotiates master/slave switch with master mobile device 100C (and gives the AM_Address).
[9] The piconet managing master device 140A activates existing piconet to function as it was (with one additional mobile slave device 100C).

[B] In the second of these two alternate embodiments, the device 140B synchronizes itself with piconet managing master device 140A, but clock offset information is set to be, e.g. 50% different than that of the piconet managing master device 140A. The 50% clock offset difference means that if, for example, the hopping sequence is 79 hops, each 625 microseconds the clock difference of 140A and 140B should be at least the 625 microseconds, preferably more (e.g. 2-3 times 625 microseconds). Devices 140A and 140B have the same BD_ADDR.

The following steps occur:
[1] The device 140B hears master mobile device 100C's Inquiry, and responds to that with its own FHS packet (e.g., 1350 microseconds ahead of Device A's clock) and enters to Page Scanning-mode.
[2] The master mobile device 100C pages the device 140B and connection is established.
[3] The device 140B queries an available AM_Address from piconet managing master device 140A.
[4] The device 140B negotiates a master/slave Switch and alters the clock offset to synchronize with piconet managing master device 140A and gives the available AM_Address received from piconet managing master device 140A.
[5] The device 140B informs piconet managing master device 140A that it has a new mobile slave device 100C.
[6] The piconet managing master device 140A can activate the connection with new mobile slave device 100C.

Figure 2D:
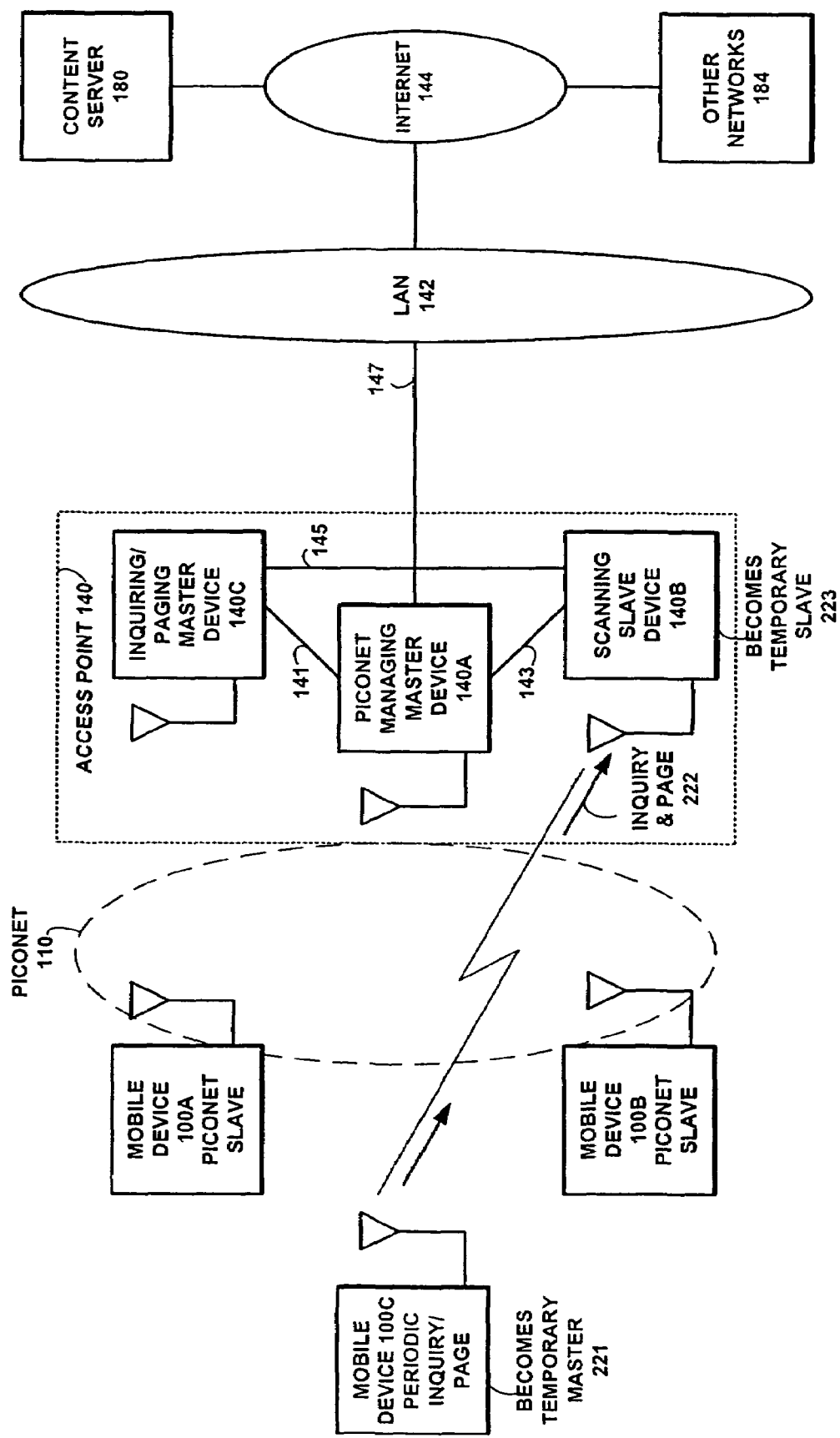
FIG. 2D illustrates the alternate embodiment wherein the access point 140 includes three devices, the piconet managing master device 140A, the scanning slave device 140B, and the inquiring/paging master device 140C. This figure shows a second embodiment, wherein after the inquiry and page have been received in step 222, the access point slave device establishes a temporary piconet with the mobile device in step 223.
Figure 2E:
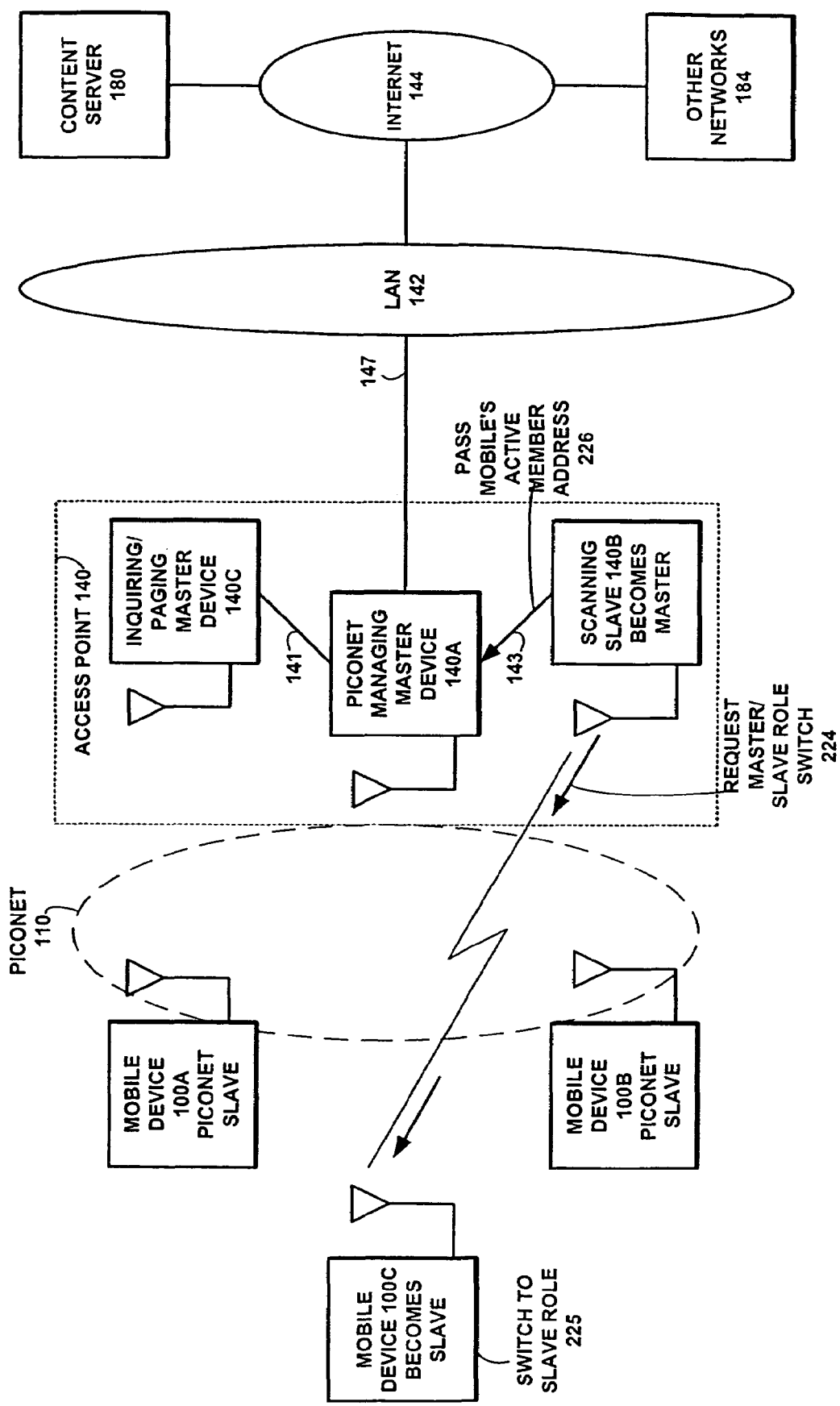
FIG. 2E illustrates the alternate embodiment in the stage following FIG. 2D, wherein the access point slave device signals for a master-slave role switch in step 224 and the mobile device switches to the slave role in step 225. Then, the access point slave device, which has assumed a temporary master role, transfers the connection formed with the mobile device, to the access point piconet managing master device at step 226.
Figure 2F:
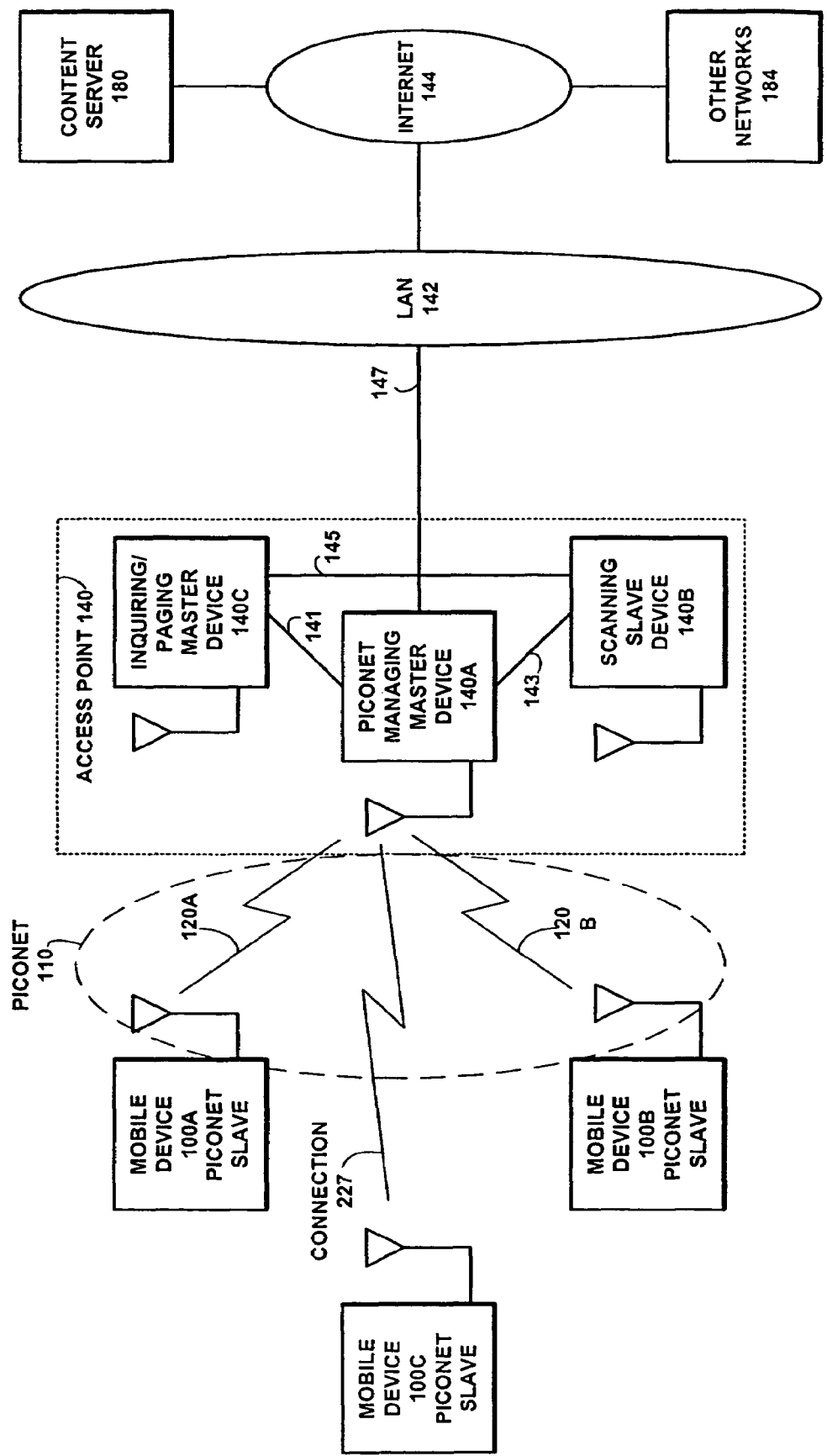
FIG. 2F illustrates the alternate embodiment in the stage following FIG. 2E, wherein the mobile device 100C has become a piconet slave to the piconet managing master device 140A in the piconet 110.

In the alternate embodiment of FIG. 2D, after the inquiry and page have been received in step 222, the access point slave device establishes a temporary piconet with the mobile device in step 223. In FIG. 2E the access point slave device signals for a master-slave role switch in step 224 and the mobile device switches to the slave role in step 225. Then, the access point slave device, which has assumed a temporary master role, transfers the connection formed with the mobile device, to the access point piconet managing master device at step 226. In FIG. 2F the mobile device 100C has become a piconet slave to the piconet managing master device 140A in the piconet 110.

Figure 3A:
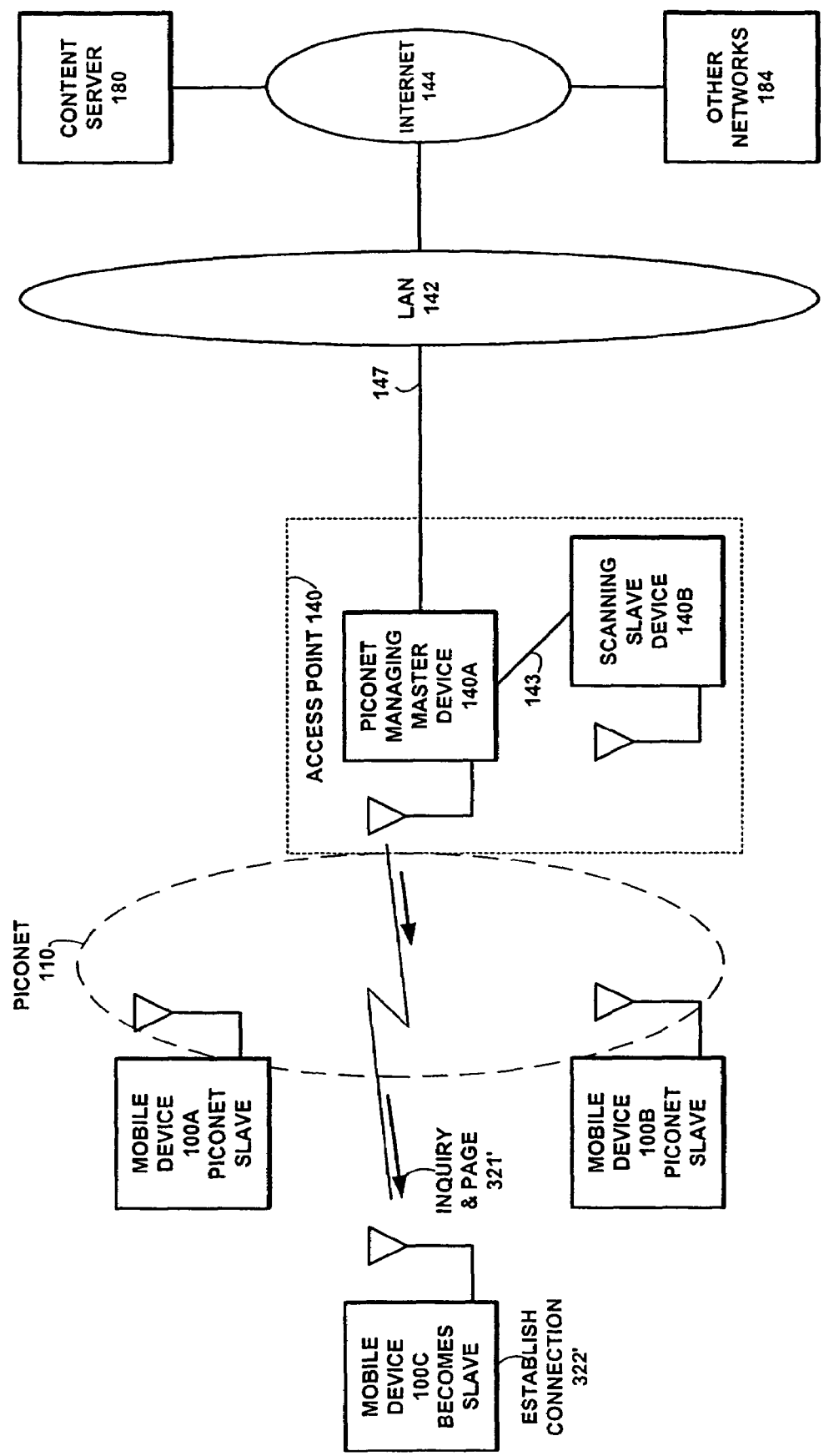
FIG. 3A illustrates the preferred embodiment wherein the access point 140 includes two devices, the piconet managing master device 140A and the scanning slave device 140B. This figure shows the access point master device transmitting inquiry and paging packets and establishing a connection with the mobile slave device.
Figure 3B:
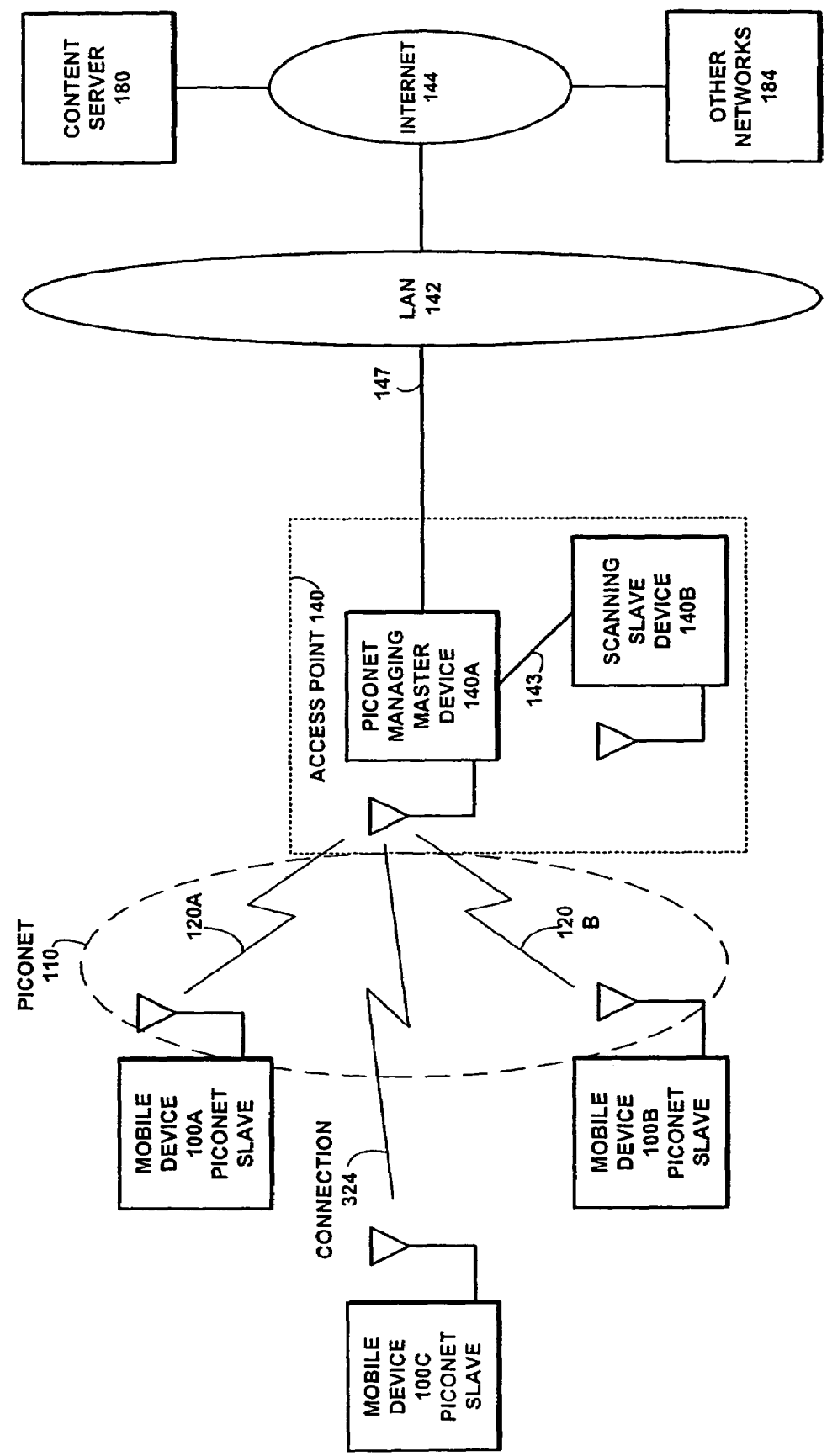
FIG. 3B illustrates the preferred embodiment in the stage following FIG. 3A, wherein the mobile device 100C has become a piconet slave to the piconet managing master device 140A in the piconet 110.

In the preferred embodiment of FIG. 3A the access point master device transmits inquiry and paging packets and establishes a connection with the mobile slave device. In FIG. 3B the mobile device 100C has become a piconet slave to the piconet managing master device 140A in the piconet 110.

Figure 3C:
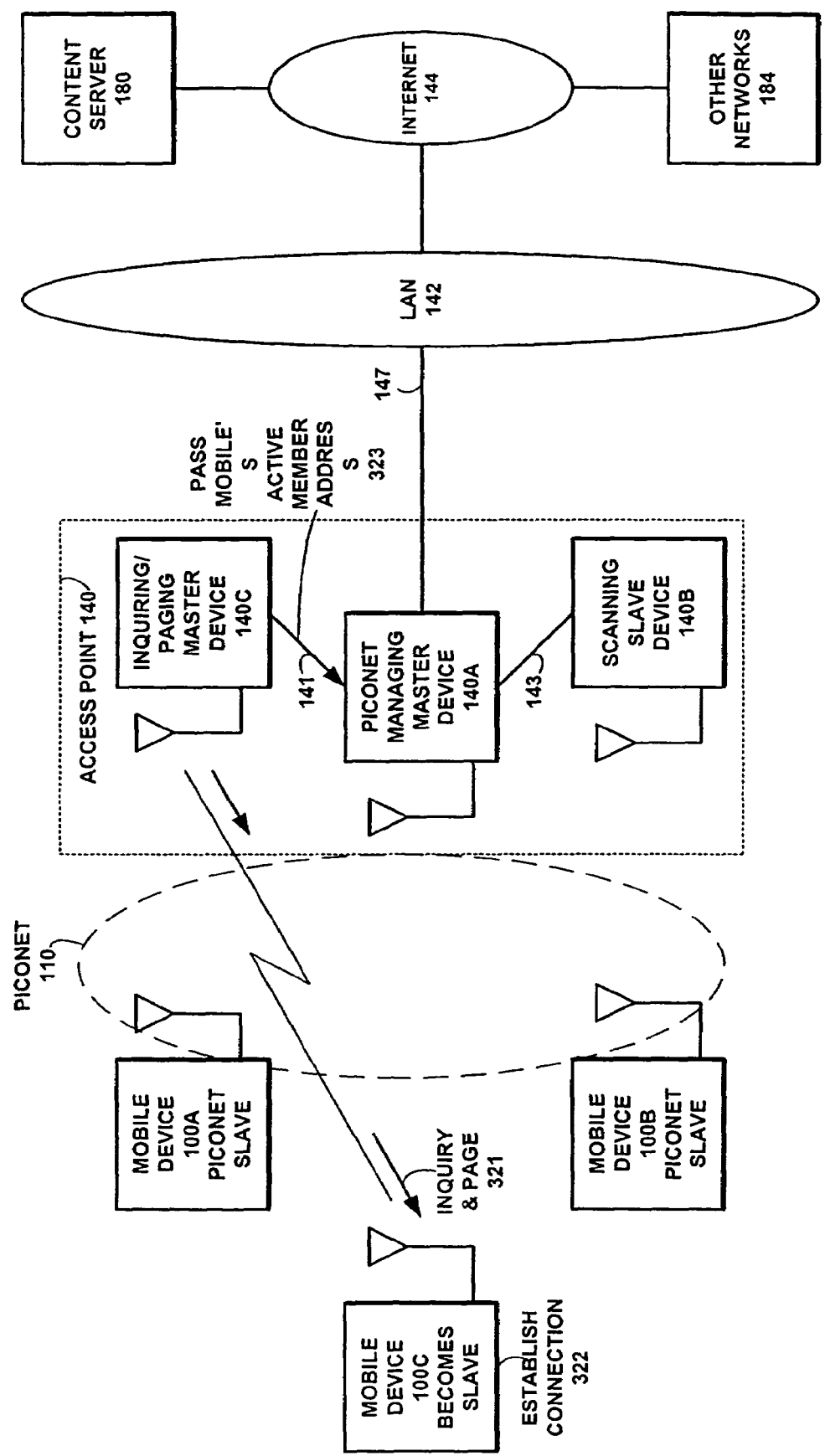
FIG. 3C illustrates the alternate embodiment wherein the access point 140 includes three devices, the piconet managing master device 140A, the scanning slave device 140B, and the inquiring/paging master device 140C. This figure shows the inquiring/paging master device 140C transmitting inquiry and paging packets in step 321 and establishing a connection with the mobile slave device in step 322. The inquiring/paging master device 140C then passes the mobile's connection to the piconet managing master device 140A in step 323.
Figure 3D:
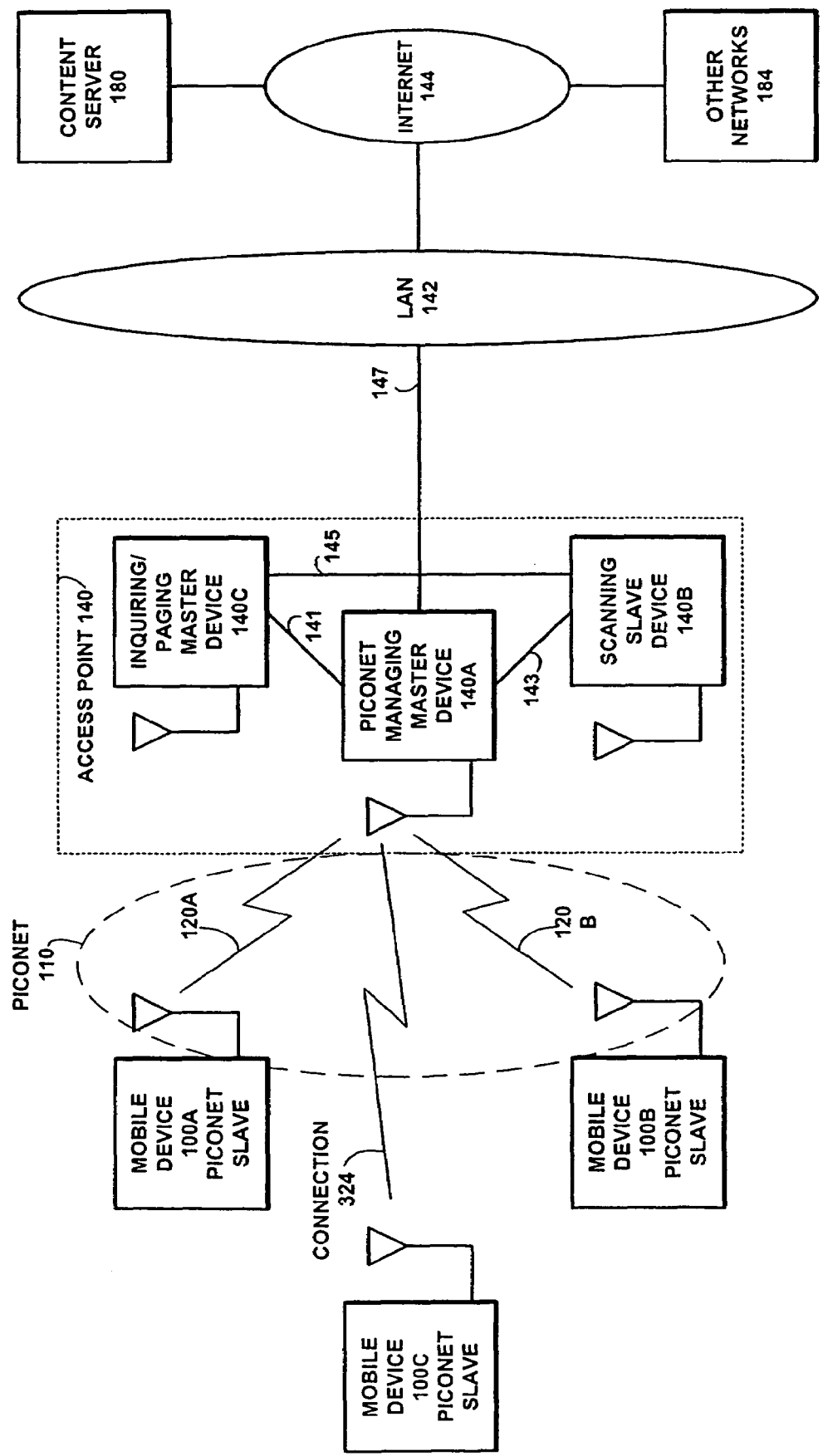
FIG. 3D illustrates the alternate embodiment in the stage following FIG. 3C, wherein the mobile device 100C has become connected as a piconet slave in step 324 to the piconet managing master device 140A in the piconet 110.

In the alternate embodiment of FIG. 3C the inquiring/paging master device 140C is transmitting inquiry and paging packets in step 321 and establishing a connection with the mobile slave device in step 322. The inquiring/paging master device 140C then passes the mobile's connection to the piconet managing master device 140A in step 323. In FIG. 3D the mobile device 100C has become connected as a piconet slave in step 324 to the piconet managing master device 140A in the piconet 110.

In still another alternate embodiment, the three assigned Bluetooth devices 140A, 140B, and 140C in FIG. 1, can change their "assignment" as the situation requires. For example, where the piconet managing master device 140A is already serving seven active slave devices 100A, 100B, 100C, etc. and the scanning slave device 140B receives an Inquiry from an eighth mobile device wanting service. In this case, the scanning slave device 140B can change its "assignment" to a second piconet managing master device and start serving the eighth mobile device. This can be done easily, because the control of the scanning slave device 140B is software based. Now, the access point can serve more than seven active mobile slave devices.

Figure 4:
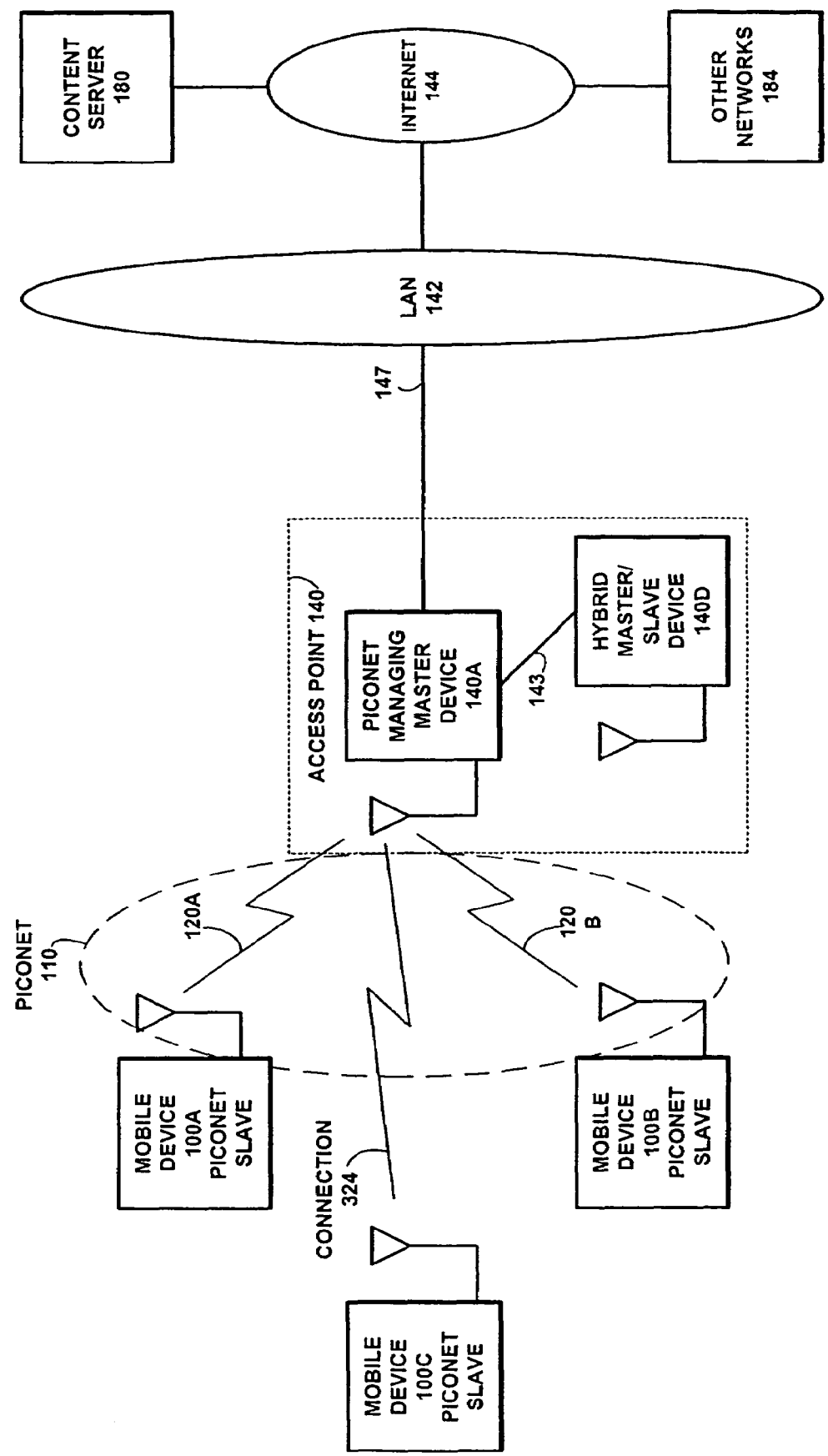
FIG. 4 illustrates an alternate embodiment wherein the access point 140 includes two devices, the piconet managing master device 140A and the hybrid master/slave device 140D. The hybrid master/slave device 140D blends the features of the scanning slave device 140B and the inquiring/paging master device 140C.
Figure 5:
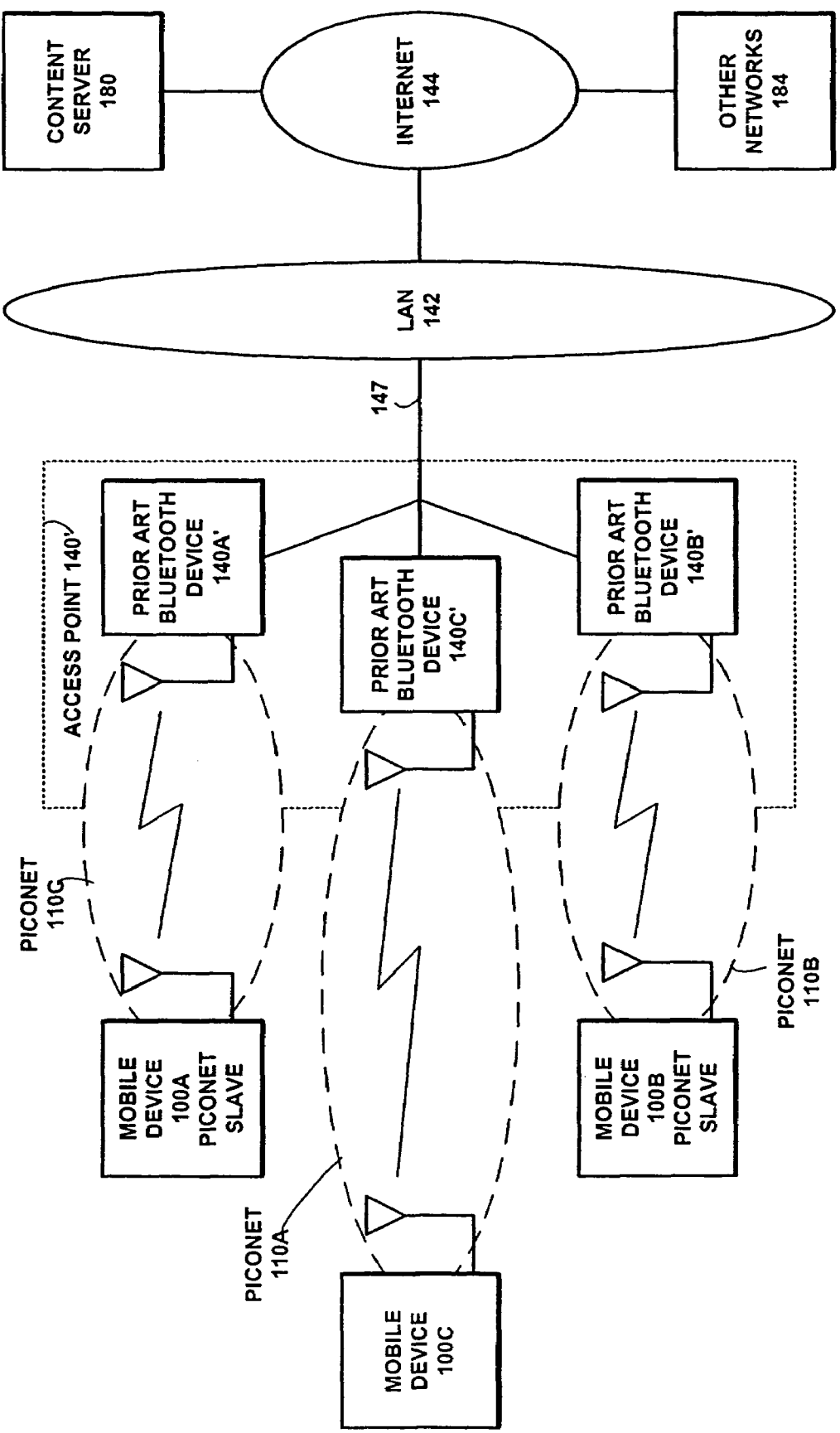
FIG. 5 illustrates an example prior art system, where the access point 140' can have one or more prior art Bluetooth communication modules 140A, 140B, and 140C that function independently.

FIG. 4 illustrates an alternate embodiment wherein the access point 140 includes two devices, the piconet managing master device 140A and the hybrid master/slave device 140D. The hybrid master/slave device 140D blends the features of the scanning slave device 140B and the inquiring/paging master device 140C. The hybrid master/slave device 140D is programmed to periodically enter the inquiry scanning state and page scanning state to listen for inquires and pages from mobile devices in the vicinity, in a manner similar to that described for the scanning slave device 140B When the hybrid master/slave device 140D receives an inquiry or page packet from a mobile device, it transfers to the piconet managing master device 140A, the handling of the connection to the mobile device, in a manner similar to that described for the scanning slave device 140B. The hybrid master/slave device 140D is further programmed to periodically enter the inquiry state and paging state to transmit inquires and pages to mobile devices in the vicinity, in a manner similar to that described for the inquiring/paging master device 140C. When the hybrid master/slave device 140D establishes a connection with a mobile device, it transfers to the piconet managing master device 140A, the handling of the connection to the mobile device, in a manner similar to that described for the inquiring/paging master device 140C.

In another alternate embodiment, the invention can be embodied as a wireless transceiver that is either a fixed station access point or alternately a mobile wireless transceiver. The managing master device in the transceiver, manages existing connections with mobile slave devices in a wireless network. The scanning slave device in the transceiver, forms connections with mobile master devices. The inquiring/paging master device in the transceiver, transmits inquiry and paging packets and establishes connections with potential slave devices that respond. In one implementation, the wireless transceiver is a stationary access point coupled to an infrastructure network. In another implementation, the wireless transceiver is a mobile wireless transceiver. In still another embodiment, the scanning slave device and the inquiring/paging master are the same hybrid device, the hybrid device being programmed to periodically operate as the scanning slave device and alternately as the inquiring/paging master device.

The resulting invention solves the problem of how to maximize bandwidth of an access point or wireless transceiver and the speed of its establishing a connection with both mobile master devices and mobile slave devices.

Although a specific embodiment of the invention has been disclosed, it will be understood by those having skill in the art that changes can be made to that specific embodiment without departing from the spirit and the scope of the invention.

What is claimed is:

1. An apparatus comprising:
   at least one first wireless transceiver module configured to scan packets initiated by wireless devices within a coverage area of the apparatus and in response to a packet, outputting a control signal; and
   at least one second wireless transceiver module coupled to the at least one first wireless transceiver module, configured to transmit messages in response to the control signal, for establishing wireless connections with wireless devices.

2. The apparatus of claim 1 wherein the at least one first wireless transceiver module is further configured to transmit inquiry and paging packets and establish connections.

3. The apparatus of claim 1 wherein the at least one first wireless transceiver module is configured to receive inquiry and paging packets.

4. The apparatus of claim 3 wherein the inquiry and paging packets are initiated by devices within the coverage area of the at least one first wireless transceiver module.

5. The apparatus of claim 1 wherein the at least one first wireless transceiver module is further configured to pass control to at least one second wireless transceiver module upon receiving inquiry and paging packets from a particular wireless device.

6. The apparatus of claim 1 further comprising:
   at least one third wireless transceiver operate as an inquiring/paging master device for establishing a connection with wireless devices that respond to its inquiries.

7. A short-range RF access point, comprising:
   at least one first wireless transceiver module configured for operating as an access point master device for transmitting inquiry and paging packets for establishing wireless connections with wireless devices responding to the messages within the coverage area of the access point; and
   at least one second wireless transceiver module configured for operating as an access point slave device for scanning inquiry and paging packets initiated by wireless devices within the coverage area of the access point and passing control to the access point master device upon receiving connection establishment message from a particular wireless device.

8. The short-range RF access point of claim 1 further comprising:
   at least one third wireless transceiver configured for operating as an inquiring/paging master device for establishing a connection with wireless devices that respond to its inquiries.

9. The short-range access point of claim 8 further comprising:
   at least one hybrid device configured for periodically performing the functions of the access point slave device and the inquiring/paging master device.

10. An apparatus comprising:
    at least one first wireless transceiver module configured to transmit messages establishing wireless connections with wireless devices responding to the messages within the coverage area of the at least one first wireless transceiver module;
    at least one second wireless transceiver module coupled to the at least one first wireless transceiver module and configured to scan packets initiated by wireless devices within the coverage area of the at least one second wireless transceiver module; and
    wherein there is control among the at least one first wireless transceiver module and at least one second wireless transceiver module.

11. The apparatus of claim 10 wherein the at least one first wireless transceiver module is further configures to transmit inquiry and paging packets and establish connections.

12. The apparatus of claim 10 wherein the at least one second wireless transceiver module is further configured to receive inquiry and paging packets.

13. The apparatus of claim 12 wherein the inquiry and paging packets are initiated by wireless devices within the coverage area of the at least one second wireless transceiver module.

14. The short-range RF access point of claim 10 wherein the at least one second wireless transceiver module is further configured to pass control to the at least one first wireless transceiver module upon receiving inquiry and paging packets from a particular wireless device.

15. The apparatus of claim 10 further comprising:
at least one third wireless transceiver configured to operate as an inquiring/paging master device for establishing a connection with wireless devices that respond to its inquiries.

16. A short-range RF access point, comprising:
at least one first wireless transceiver module configured for operating as an access point master device for transmitting messages for establishing wireless connections with wireless devices responding to the messages within the coverage area of the access point; and
at least one second wireless transceiver module configured for operating as an access point slave device coupled to the access point master device for scanning packets initiated by wireless devices within the coverage area of the access point wherein there is control between the master and slave devices.

17. The short-range RF access point of claim 16 wherein the access point master device is further configured to transmit inquiry and paging packets and establish connections.

18. The short-range RF access point of claim 16 wherein the access point slave device is further configured to receive inquiry and paging packets.

19. The short-range RF access point of claim 18 wherein the inquiry and paging packets are initiated by wireless devices within the coverage area of the access point.

20. The short-range RF access point of claim 16 wherein the access point slave device is further configured to pass control to the access point master device upon receiving inquiry and paging packets from a particular wireless device.

21. The short-range RF access point of claim 16 further comprising:
at least one third wireless transceiver configured for operating as an inquiring/paging master device for establishing a connection with wireless devices that respond to its inquiries.

22. The short-range RF access point of claim 21 further comprising:
at least one hybrid device configured for periodically performing the functions of the access point slave device and the inquiring/paging master device.

23. A method, comprising:
operating at least one first wireless transceiver module scanning packets initiated by wireless devices within a coverage area of the at least one first wireless transceiver module and in response to a packet, outputting a control signal; and
operating at least one second wireless transceiver module coupled to the first module as for transmitting messages in response to the control signal, for establishing wireless connections with wireless devices.

24. The method of claim 23 wherein the at least one second wireless transceiver module transmits inquiry and paging packets and establishes connections.

25. The method of claim 23 wherein the at least one first wireless transceiver module receives inquiry and paging packets.

26. The method of claim 25 wherein an access point slave device passes control to the at least one second wireless transceiver module upon receiving inquiry and paging packets from a particular wireless device.

27. The method of claim 23 further comprising:
operating at least one third wireless transceiver as an inquiring/paging master device for establishing a connection with wireless devices that respond to its inquiries.

28. The method of claim 23 further comprising:
periodically performing in at least one hybrid device the functions of an access point slave device and an inquiring/paging master device.

29. A computer readable medium encoded with program code, comprising:
program code for operating at least one first wireless transceiver module as an access point slave device for scanning packets initiated by wireless devices within a coverage area of the access point and in response to a packet, outputting a control signal; and
program code for operating at least one second wireless transceiver module coupled to the first module as an access point master device for transmitting messages in response to the control signal, for establishing wireless connections with wireless devices.

30. The computer readable medium of claim 29 further comprising:
program code in the access point master device for transmitting inquiry and paging packets and establishes connections.

31. The computer readable medium of claim 29 further comprising:
program code in the access point slave device for receiving inquiry and paging packets.

32. The computer readable medium of claim 30 further comprising:
program code in the access point slave device for passing control to the access point master device upon receiving inquiry and paging packets from a particular wireless device.

33. The computer readable medium of claim 29 further comprising:
program code for operating at least one third wireless transceiver as an inquiring/paging master device for establishing a connection with wireless devices that respond to its inquiries.

34. The computer readable medium of claim 29 further comprising:
program code for periodically performing in at least one hybrid device the functions of the access point slave device and the inquiring/paging master device.

* * * * *

UNITED STATES PATENT AND TRADEMARK OFFICE
CERTIFICATE OF CORRECTION

PATENT NO. : 7,602,754 B2  Page 1 of 1
APPLICATION NO. : 10/861483
DATED : October 13, 2009
INVENTOR(S) : Heinonen et al.

It is certified that error appears in the above-identified patent and that said Letters Patent is hereby corrected as shown below:

Column 16

In claim 8, line 33, "access point of claim 1" should read, --access point of claim 7--.

In claim 11, line 58, "is further configures to" should read, --is further configured to--.

Signed and Sealed this

Twenty-ninth Day of December, 2009

David J. Kappos
*Director of the United States Patent and Trademark Office*